(12) United States Patent
Park et al.

(10) Patent No.: US 10,339,672 B2
(45) Date of Patent: Jul. 2, 2019

(54) METHOD AND ELECTRONIC DEVICE FOR VERIFYING LIGHT SOURCE OF IMAGES

(71) Applicant: SAMSUNG ELECTRONICS CO., LTD., Suwon-si, Gyeonggi-do (KR)

(72) Inventors: Jae Hyoung Park, Yongin-si (KR); Jeong Won Lee, Seongnam-si (KR); Kyong Tae Park, Suwon-si (KR); Hyeon Ji Nam, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 12 days.

(21) Appl. No.: 15/496,273

(22) Filed: Apr. 25, 2017

(65) Prior Publication Data

US 2017/0330348 A1 Nov. 16, 2017

(30) Foreign Application Priority Data

May 12, 2016 (KR) .......................... 10-2016-0057948

(51) Int. Cl.
*H04N 5/369* (2011.01)
*G06T 7/90* (2017.01)
(Continued)

(52) U.S. Cl.
CPC ............ *G06T 7/90* (2017.01); *H04N 5/3696* (2013.01); *H04N 9/045* (2013.01); *H04N 9/735* (2013.01)

(58) Field of Classification Search
CPC ........... G06T 7/90; H04N 9/735; H04N 9/045
See application file for complete search history.

(56) References Cited

U.S. PATENT DOCUMENTS

| 5,270,802 A | 12/1993 | Takagi et al. |
| 8,229,215 B2 * | 7/2012 | Li ........................ H04N 1/6077 382/162 |

(Continued)

FOREIGN PATENT DOCUMENTS

| KR | 10-2010-0032618 | 3/2010 |
| KR | 10-2010-0035906 | 4/2010 |

(Continued)

OTHER PUBLICATIONS

Search Report and Written Opinion dated Jun. 16, 2017 in counterpart International Patent Application No. PCT/KR2017/004026.

(Continued)

*Primary Examiner* — Twyler L Haskins
*Assistant Examiner* — Angel L Garces-Rivera
(74) *Attorney, Agent, or Firm* — Nixon & Vanderhye P.C.

(57) ABSTRACT

An electronic device includes an image sensor including a pixel array, and an image processor electrically connected with the image sensor. The image processor is configured to acquire a first image of a subject generated based on a first group of optical paths and to acquire a second image of the subject generated based on a second group of optical paths, the second group of optical paths having a phase difference with the first group of optical paths from the pixel array, to normalize pixel values included in the first image and pixel values included in the second image in units of a pixel, and to verify a light source of light reflected by the subject or a light source of light produced from the subject, based on a parameter associated with changes in the normalized pixel values.

20 Claims, 18 Drawing Sheets

(51) Int. Cl.
H04N 9/04 (2006.01)
H04N 9/73 (2006.01)

(56) References Cited

U.S. PATENT DOCUMENTS

| | | |
|---|---|---|
| 8,357,899 B2 | 1/2013 | Liu et al. |
| 8,941,757 B2 | 1/2015 | Seok et al. |
| 8,970,728 B2 | 3/2015 | Horikawa et al. |
| 9,129,188 B2 | 9/2015 | Hata et al. |
| 9,467,672 B2 | 10/2016 | Kuchiki |
| 9,485,483 B2 | 11/2016 | Cho et al. |
| 9,595,556 B2 | 3/2017 | Ahn et al. |
| 2012/0025080 A1 | 2/2012 | Liu et al. |
| 2013/0128073 A1 | 5/2013 | Seok et al. |
| 2013/0308011 A1 | 11/2013 | Horikawa et al. |
| 2013/0343646 A1 | 12/2013 | Hata et al. |
| 2014/0239431 A1 | 8/2014 | Miyashita |
| 2015/0296194 A1 | 10/2015 | Cho et al. |
| 2016/0007001 A1 | 1/2016 | Kuchiki |
| 2016/0035770 A1 | 2/2016 | Ahn et al. |

FOREIGN PATENT DOCUMENTS

| | | |
|---|---|---|
| KR | 10-2013-0056442 | 5/2013 |
| KR | 10-2014-0105887 | 9/2014 |
| KR | 10-2016-0016015 | 2/2016 |

OTHER PUBLICATIONS

European Search Report for EP Application No. 17796293.3 dated Jan. 7, 2019.

\* cited by examiner

METHOD AND ELECTRONIC DEVICE FOR VERIFYING LIGHT SOURCE OF IMAGES

CROSS-REFERENCE TO RELATED APPLICATION

This application is based on and claims priority under 35 U.S.C. § 119 to a Korean patent application filed on May 12, 2016 in the Korean Intellectual Property Office and assigned Serial number 10-2016-0057948, the disclosure of which is incorporated by reference herein in its entirety.

TECHNICAL FIELD

The present disclosure relates generally to a method for verifying a light source upon taking a picture of a subject, by using an image of a sensor in which a phase difference occurs and an electronic device performing the same.

BACKGROUND

As IT technologies are highly developed, a camera has evolved from a traditional film camera into a digital camera. The digital camera may convert light into an electrical image signal and may store the electrical image signal as digital data (image data).

Unlike a conventional film camera, the digital camera may perform white balancing for correction into a specific neutral color of a subject in consideration of a color temperature of light applied to the subject at shooting. In general, the white balancing technique has tracked an achromatic colored area in some or all pixels of a taken image and has adjusted a color temperature of the whole image based on the pixel values of the achromatic colored area.

However, according to the general white balancing technique, since a color of a light source and a specific color of a subject are mixed in a taken image of the subject, it may be impossible to exactly or precisely estimate a color temperature and a type of a light source, which are needed to apply the white balancing technique. Also, if the general white balancing technique is used, since there is a need to implement algorithms respectively in consideration of a method for verifying a typical light source and a method for verifying an exceptional light source, a computing resource of an electronic device (e.g., a camera) has been excessively used, thereby causing a large increase in power and time consumption.

SUMMARY

Example aspects of the present disclosure address at least the above-mentioned problems and/or disadvantages and provide at least the advantages described below. Accordingly, an example aspect of the present disclosure is to provide a method for verifying a light source of light reflected by a subject or a light source of light produced from the subject using a taken image and an electronic device performing the same. Another example aspect of the present disclosure is to provide a method for performing white balancing based on the verified light source and an electronic device performing the same.

In accordance with an example aspect of the present disclosure, an electronic device includes an image sensor comprising a pixel array, and an image processor electrically connected with the image sensor. The image processor is configured to acquire a first image of a subject generated based on a first group of optical paths and to acquire a second image of the subject generated based on a second group of optical paths, the second group of optical paths having a phase difference with the first group of optical paths from the pixel array, to normalize pixel values included in the first image and pixel values included in the second image in units of a pixel, and to verify a light source of light reflected by the subject or a light source of light produced from the subject, based on a parameter associated with changes in the normalized pixel values.

In accordance with another example aspect of the present disclosure, a method includes acquiring a first image of a subject generated based on a first group of optical paths and acquiring a second image of the subject generated based on a second group of optical paths, the second group of optical paths having a phase difference with the first group of optical paths, normalizing pixel values included in the first image and pixel values included in the second image in units of a pixel, and verifying a light source of light reflected by the subject or a light source of light produced from the subject, based on a parameter associated with changes in the normalized pixel values.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily understood from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
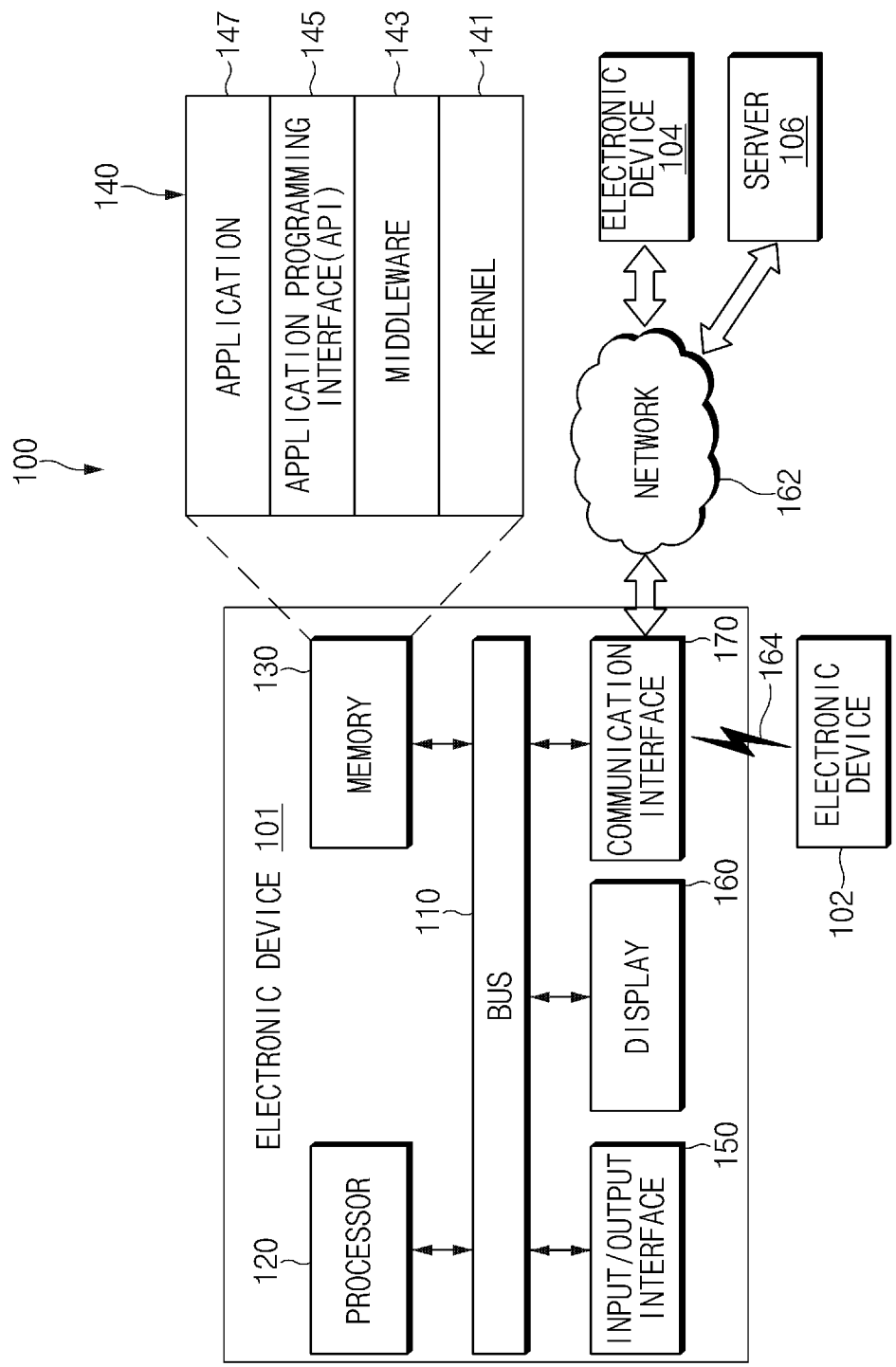
FIG. 1 is a diagram illustrating an example electronic device in a network environment, according to various example embodiments.

Various example embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" does not refer only to "specifically designed to" in hardware. Instead, the expression "a device configured to" may refer to a situation in which the device is "capable of" operating together with another device or other components. CPU, for example, a "processor configured to perform A, B, and C" may refer to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe various example embodiments of the present disclosure and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various example embodiments of the present disclosure. In some cases, even if terms are terms which are defined in the disclosure, they may not be interpreted to exclude embodiments of the present disclosure.

An electronic device according to various example embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but are not limited thereto. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit), or the like, but are not limited thereto.

According to various example embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, or the like, but are not limited thereto.

According to another example embodiment, the electronic device may include at least one of medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to an example embodiment, the electronic device may include at least one of parts of furniture or buildings/structures, electronic boards, electronic signature receiving devices, projectors, or various measuring instruments (e.g., water meters, electricity meters, gas meters, or wave meters, and the like), or the like but is not limited thereto. According to various embodiments, the electronic device may be one of the above-described devices or a combination thereof. An electronic device according to an example embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various example embodiments will be described with reference to the accompanying drawings. The term "user" used herein may refer to a person who uses an electronic device or may refer to a device (e.g., an artificial intelligence electronic device) that uses an electronic device.

FIG. 1 is a diagram illustrating an example electronic device in a network environment, according to various example embodiments.

Referring to FIG. 1, according to various embodiments, an electronic device 101, 102, or 104 or a server 106 may be connected with each other over a network 162 or a short range communication 164. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include various processing circuitry, such as, for example, and without limitation, one or more of a dedicated processor, a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be called an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may include various input/output circuitry and play a role, for example, as an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may include various communication circuitry and establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include at least one of, for example, LTE (long-term evolution), LTE-A (LTE Advanced), CDMA (Code Division Multiple Access), WCDMA (Wideband CDMA), UMTS (Universal Mobile Telecommunications System), WiBro (Wireless Broadband), GSM (Global System for Mobile Communications), or the like, as cellular communication protocol. Furthermore, the wireless communication may include, for example, the short range communication 164. The short range communication 164 may include at least one of a wireless fidelity (Wi-Fi), a Bluetooth, a near field communication (NFC), a magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
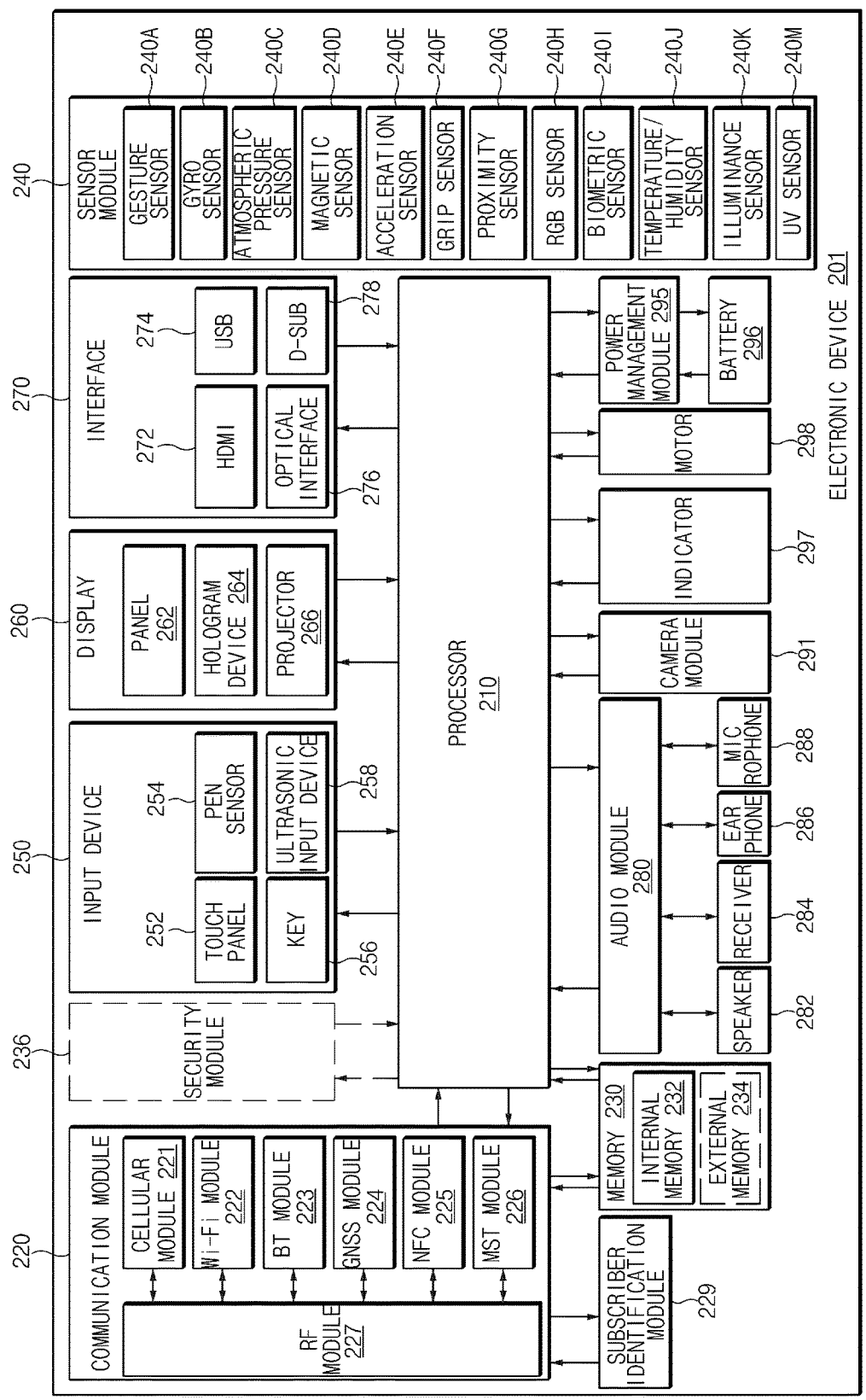
FIG. 2 is a block diagram illustrating an example electronic device, according to various example embodiments.

FIG. 2 is a block diagram illustrating an example electronic device, according to various example embodiments.

Referring to FIG. 2, an electronic device 201 may include, for example, all or a part of the electronic device 101 illustrated in FIG. 1. The electronic device 201 may include one or more processors (e.g., an application processor) (e.g., including processing circuitry) 210, a communication module (e.g., including communication circuitry) 220, a subscriber identification module 229, a memory 230, a security module 236, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and drive, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load and process an instruction or data, which is received from at least one of other elements (e.g., a nonvolatile memory) and may store a variety of data in a nonvolatile memory.

The communication module 220 may be configured the same as or similar to the communication interface 170 of FIG. 1. The communication module 220 may include various communication circuitry, such as, for example, and without limitation, a cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226, and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 and/or an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory)), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may include data security circuitry and be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electrical signal. Generally or additionally, the sensor module 240 may include at least one of a gesture sensor 240A, a gyro sensor 240B, a barometric pressure (e.g., atmospheric pressure) sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography sensor (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include various input circuitry, such as, for example, and without limitation, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. The screen may be arranged in the inside or the outside of the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

The camera module 291 for shooting a still image or a video may include, for example, at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various example embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
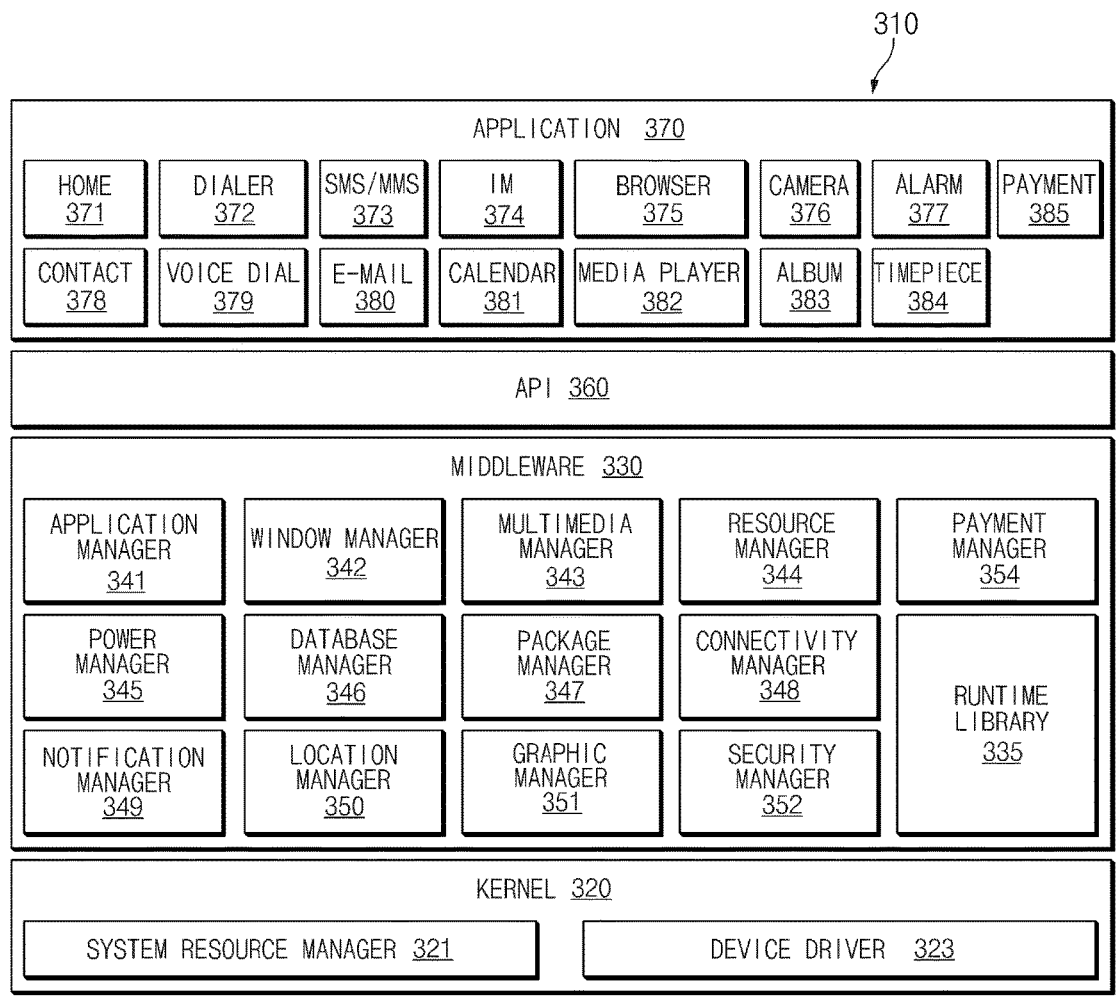
FIG. 3 is a block diagram illustrating an example program module, according to various example embodiments.

FIG. 3 is a block diagram illustrating an example program module, according to various example embodiments.

Referring to FIG. 3, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Samsung bada OS™.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, and the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an interprocess communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a GUI resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security or user authentication. According to an embodiment, in the case where an electronic device (e.g., the electronic device 101) includes a telephony function, the middleware 330 may further includes a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is the android or the iOS, it may be permissible to provide one API set per platform. In the case where an OS is the tizen, it may be permissible to provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, or a payment 385, or capable of offering health care (e.g., measuring an exercise quantity, blood sugar, or the like) or environment information (e.g., atmospheric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an example embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The element titles of the program module 310 according to the embodiment may be modifiable depending on kinds of operating systems.

According to various example embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
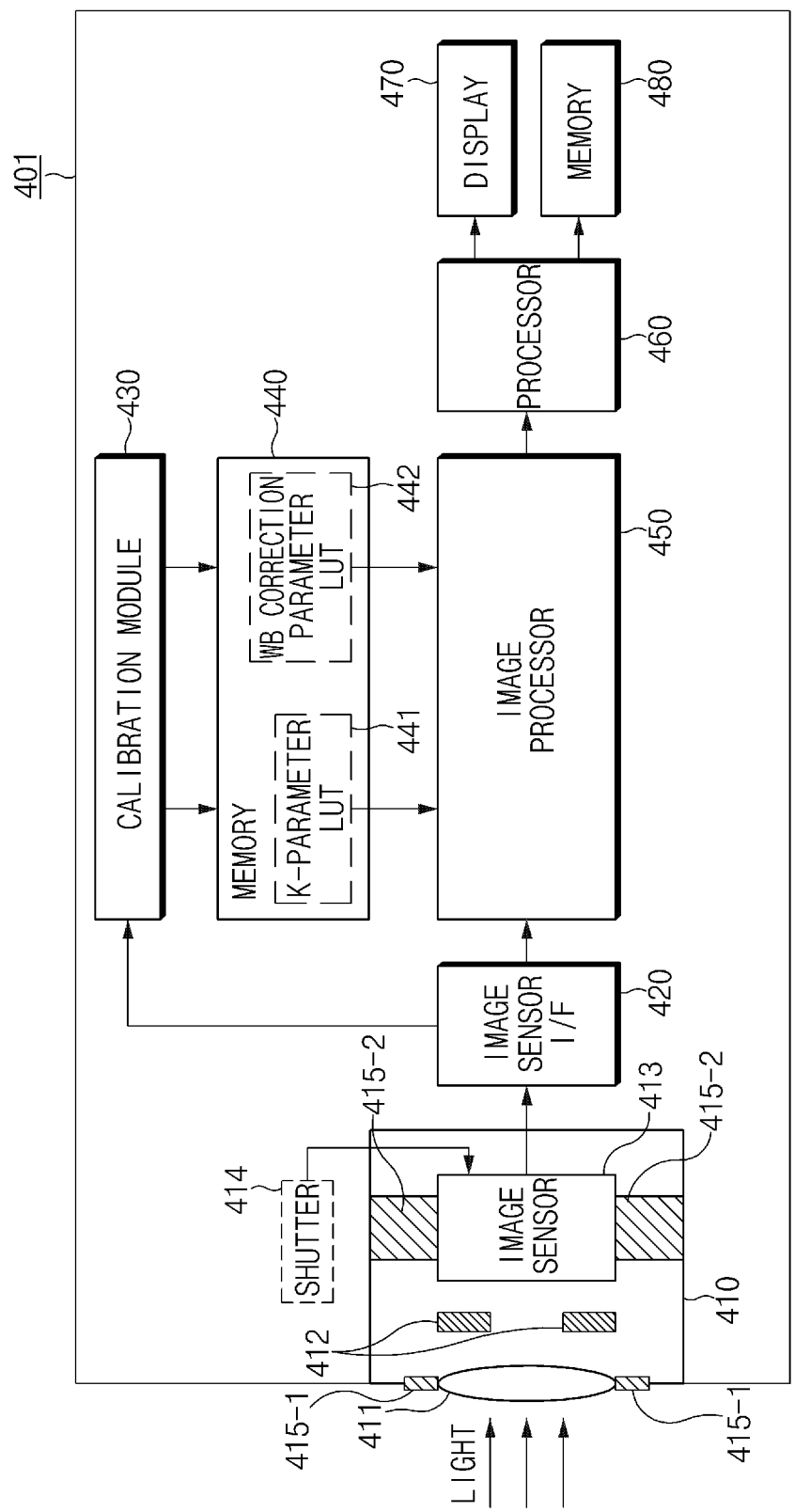
FIG. 4 is a block diagram illustrating an example electronic device, according to an example embodiment of the present disclosure.

FIG. 4 is a block diagram illustrating an example electronic device, according to an example embodiment of the present disclosure.

Referring to FIG. 4, an electronic device 401 according to an embodiment may include a camera module (e.g., including camera circuitry) 410, an image sensor interface (I/F) (e.g., including interface circuitry) 420, a calibration module (e.g., including calibration circuitry) 430, memories 440 and 480, an image processor (e.g., including image processing circuitry) 450, a processor (e.g., including processing circuitry) 460, and a display 470. The electronic device 401 illustrated in FIG. 4 may correspond to the electronic device illustrated in FIGS. 1 to 3, and a description of components corresponding to each other may not be herein repeated. According to various example embodiments, the electronic device 401 may be implemented without some components or may be implemented to further include one or more components not illustrated in FIG. 4.

The camera module 410 may include various camera circuitry and elements, such as, for example, and without limitation, a lens 411, an aperture (or diaphragm) 412, an image sensor 413, a shutter 414, and an optical image stabilization (OIS) driver module 415-1 and 415-2. According to various example embodiments, the camera module 410 may be implemented without some components or may be implemented to further include one or more components not illustrated in FIG. 4.

The lens 411 may focus light incident on the camera module 410 from the outside. The focused light may arrive at the image sensor 413 through the aperture 412. That is, the lens 411 may allow light reflected by a subject or light produced from the subject to arrive at a pixel array of the image sensor 413.

The aperture 412 may adjust the amount (the intensity of radiation) of incident light arriving at the image sensor 413 (or a pixel array of the image sensor 413) under control of the processor 460. In general, the amount of incident light arriving at the image sensor 413 may decrease as an aperture value becomes larger and may increase as the aperture value becomes smaller.

The image sensor 413 may include a pixel array in which a plurality of pixels are two-dimensionally arranged in a lattice or array shape. The pixel array may include millions or tens of millions of pixels, and one of a plurality of predetermined colors may be allocated to each of the pixels. For example, the plurality of predetermined colors may include "red, green, and blue (RGB)" or "red, green, blue, and white (RGBW)". The image sensor 413 may be implemented using charge-coupled device (CCD) or complementary metal-oxide-semiconductor (CMOS), or the like, for example and without limitation.

According to an example embodiment, the pixel array of the image sensor 413 may generate an electrical signal based on incident light from the outside and may generate digital image data based on the electrical signal. According to an embodiment, the pixel array of the image sensor 413 may generate first image data (or simply referred to as "first image") of a subject based on a first group of optical paths and second image data (or simply referred to as "second image") of the subject based on a second group of optical paths having a phase difference with the first group of optical paths. A configuration of the image sensor 413 will be more fully described below with reference to FIGS. 5 and 6.

The shutter 414 may adjust a time when the image sensor 413 is exposed to light. For example, if the shutter 414 operates slowly, a large amount of light is incident on the image sensor 413; if the shutter 414 operates quickly, a small amount of light is incident on the image sensor 413. A time when the shutter 414 operates may be adjusted based on a shutter speed. The shutter 414 may include a mechanical shutter or an electronic shutter of a way to control an image sensor.

The OIS driver module 415-1 and 415-2 may dynamically adjust an arrangement (or position) of the lens 411 or the pixel array. The OIS driver module 415-1 and 415-2 may finely adjust the arrangement of the lens 141 or the image sensor 413 in a direction of compensating for movement of a hand griping the electronic device 401. Accordingly, it may be possible to correct the blurring of an image due to the movement of the hand.

However, according to an example embodiment, the OIS driver module 415-1 and 415-2 may correct the blurring. In addition, the OIS driver module 415-1 and 415-2 may also finely adjust the arrangement of the lens 141 or the image sensor 413 in a specified direction under control of the processor 460 or the image processor 450. According to various embodiments, the OIS driver module 415-1 and 415-2 may be referred to as a vibration reduction (VR) module, an image stabilizer (IS), an optical stabilizer (OS), an anti-shake (AS) module, a steady shot module, and the like, according to a manufacturer of the electronic device 401.

The image sensor I/F 420 may include interface circuitry and mediate data transmission and reception between the image sensor 413 and another component (e.g., the image processor 450 or the memory 430). For example, the image sensor I/F 413 may provide the image data generated in the image sensor 413 to the image processor 450 or may provide the memory 440 with setting parameters (e.g., an aperture value, an exposure time (shutter speed), ISO (International Organization for Standardization) 12232:1998 value, ISO 12232:2006 value, or a combination thereof) of the components of the camera module 410.

The calibration module 430 may include various calibration circuitry and a reference calibration parameter and/or a shading calibration parameter. The parameters may be applied to K-parameter data (e.g., in a look up table (LUT)) 441 and/or white balance (WB) correction data (e.g., in a look up table (LUT)) 442 stored in the memory 440.

Each of the memories 440 and 480 may include a volatile and/or nonvolatile memory. For example, each of the memories 440 and 480 may store commands or data associated with at least one other component of the electronic device 401, for example. For ease of description, the memory 440 and the memory 480 are illustrated in FIG. 4 as being separate components according to functions to be executed. For example, the memory 440 and the memory 480 may be implemented with one component.

According to an example embodiment, the memory 440 may include the K-parameter data 441 and the WB correction data 442. The pieces of data 441 and 442 may be stored in a format of a look-up table (LUT). The "K-parameter" may indicate parameters associated with tendency of changes in normalized pixel values in a specified light source (to be described in detail later).

For example, the K-parameter data 441 may include LUT data in which a color temperature (or farbentemperature) of a specified light source or a type of the light source correlates with the "K-parameter".

Also, for example, the WB correction data 442 may include LUT data in which a color temperature of a specified light source or a type of the light source correlates with the corresponding WB correction data. According to various embodiments, the WB correction data 442 may be optimized by exposure information (e.g., an ISO value, a shutter speed value, an aperture value, or a combination thereof) received from the image sensor I/F 420.

According to various example embodiments, appropriate calibration may be applied to the K-parameter data 441 and the WB correction data 442 stored in the memory 440, based on a specification and any other environment configuration of the camera module 410 and/or the electronic device 401.

For example, appropriate calibration may be applied to the K-parameter data 441 and the WB correction data 442, based on an incident light center angle of a micro lens of each unit image sensor included in the pixel array and/or an occupation ratio between a plurality of photoelectric elements (or photodetectors or photoelectric devices) included in each unit image sensor (or a boundary between photoelectric elements).

Meanwhile, according to an example embodiment, the memory 480 may store image data files as final results that are obtained through processing of the image processor 450.

The image processor 450 may include various image processing circuitry and be electrically connected with the image sensor 413 of the camera module 410 and may acquire image data that the image sensor 413 generates. The image processor 450 may process the acquired image data according to various example embodiments of the present disclosure.

According to an embodiment, the image processor 450 may acquire a first image of a subject generated based on the first group of optical paths and a second image of the subject generated based on a second group of optical paths having a phase difference with the first group of optical paths, from the pixel array of the image sensor 413.

According to an example embodiment, the image processor 450 may acquire the first image (or a first group of images) and the second image (or a second group of images) for each of a plurality of predetermined colors (or color channels) (e.g., "RGB", "RGBW", "RGrGbB", or the like). For example, a first image of an R-channel generated based on the first optical path group, a first image of a G-channel generated based on the first optical path group, and a first image of a B-channel generated based on the first optical path group may form (or constitute)the first group of images. As in the above description, a second image of an R-channel generated based on the second optical path group, a second image of a G-channel generated based on the second optical path group, and a second image of a B-channel generated based on the second optical path group may form (or constitute) the second group of images.

Also, according to an embodiment, the image processor 450 may acquire the first image and the second image using various configurations.

Figure 7:
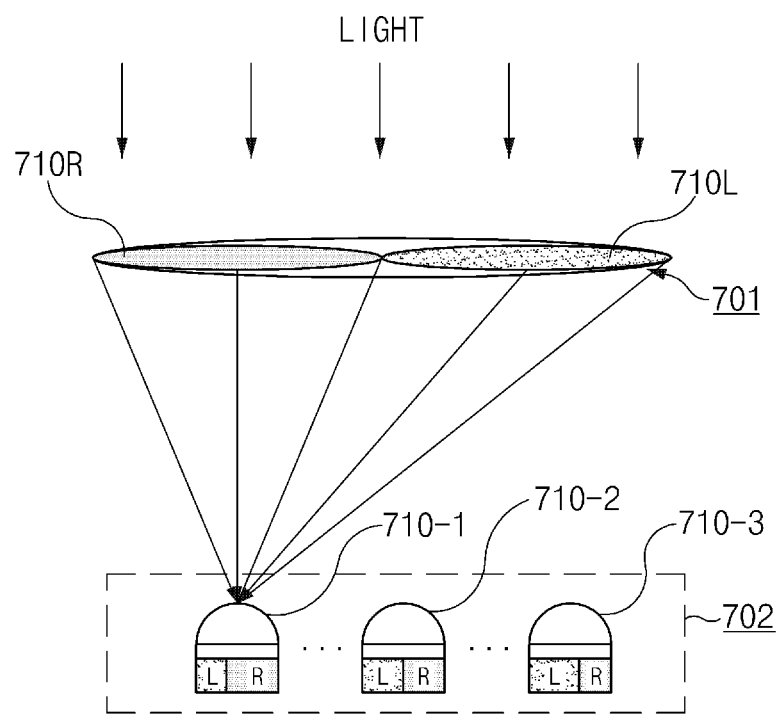
FIG. 7 is a diagram illustrating an example method for acquiring a phase difference image, according to an example embodiment.
Figure 7:
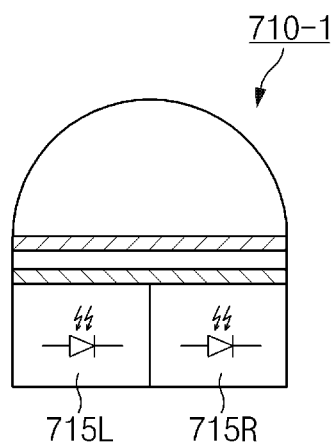

For example, the image processor 450 may acquire the first image by using a first photoelectric element included in each of the plurality of pixels of the image sensor 413 and, likewise, may acquire the second image by using a second photoelectric element included in each of the plurality of pixels (refer, for example, to FIG. 7).

Figure 15:
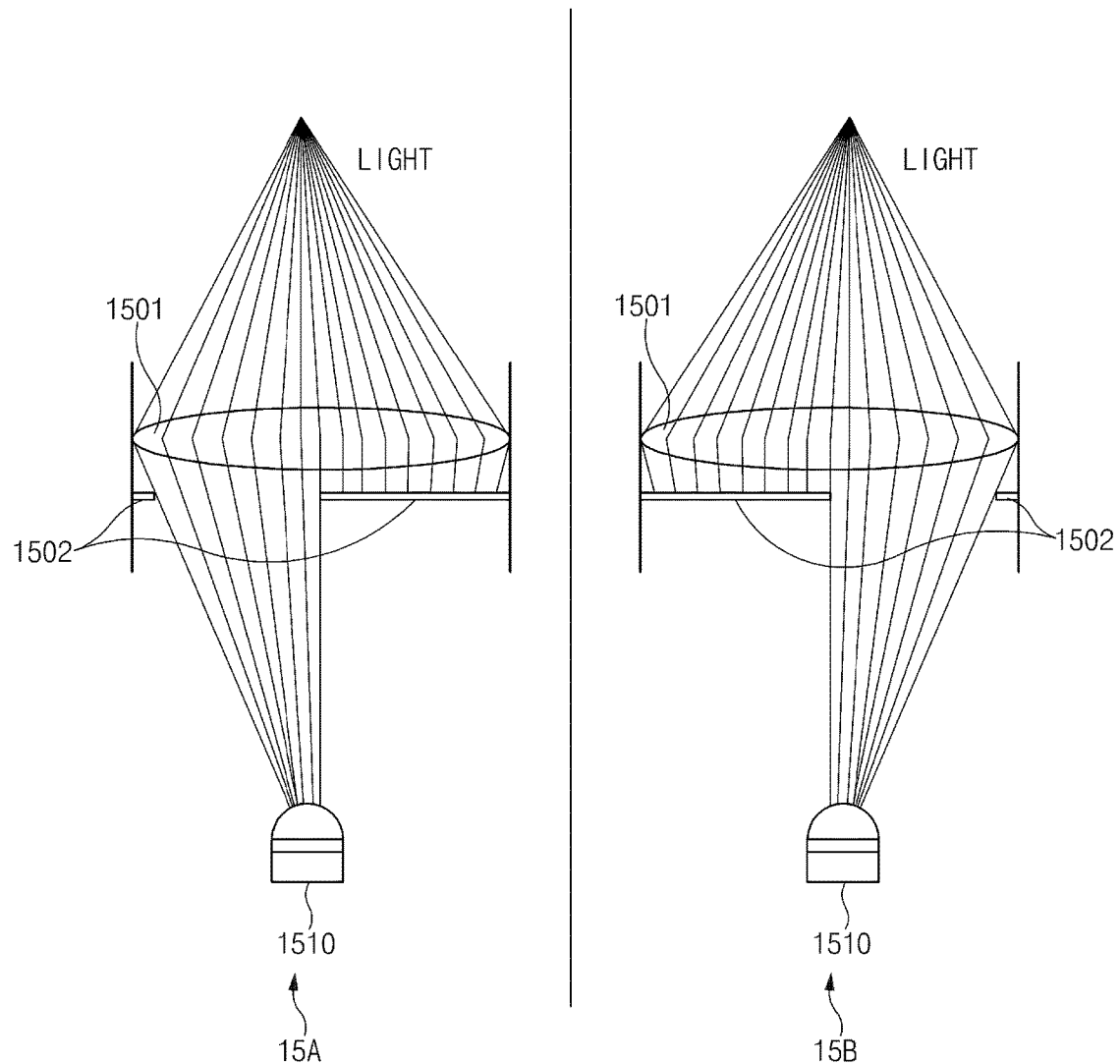
FIG. 15 is a diagram illustrating an example method for acquiring a phase difference image by using an aperture, according to an example embodiment.

As another example, the image processor 450 may acquire the first image and the second image by adjusting the aperture 412 (refer, for example, to FIG. 15).

Figure 16:
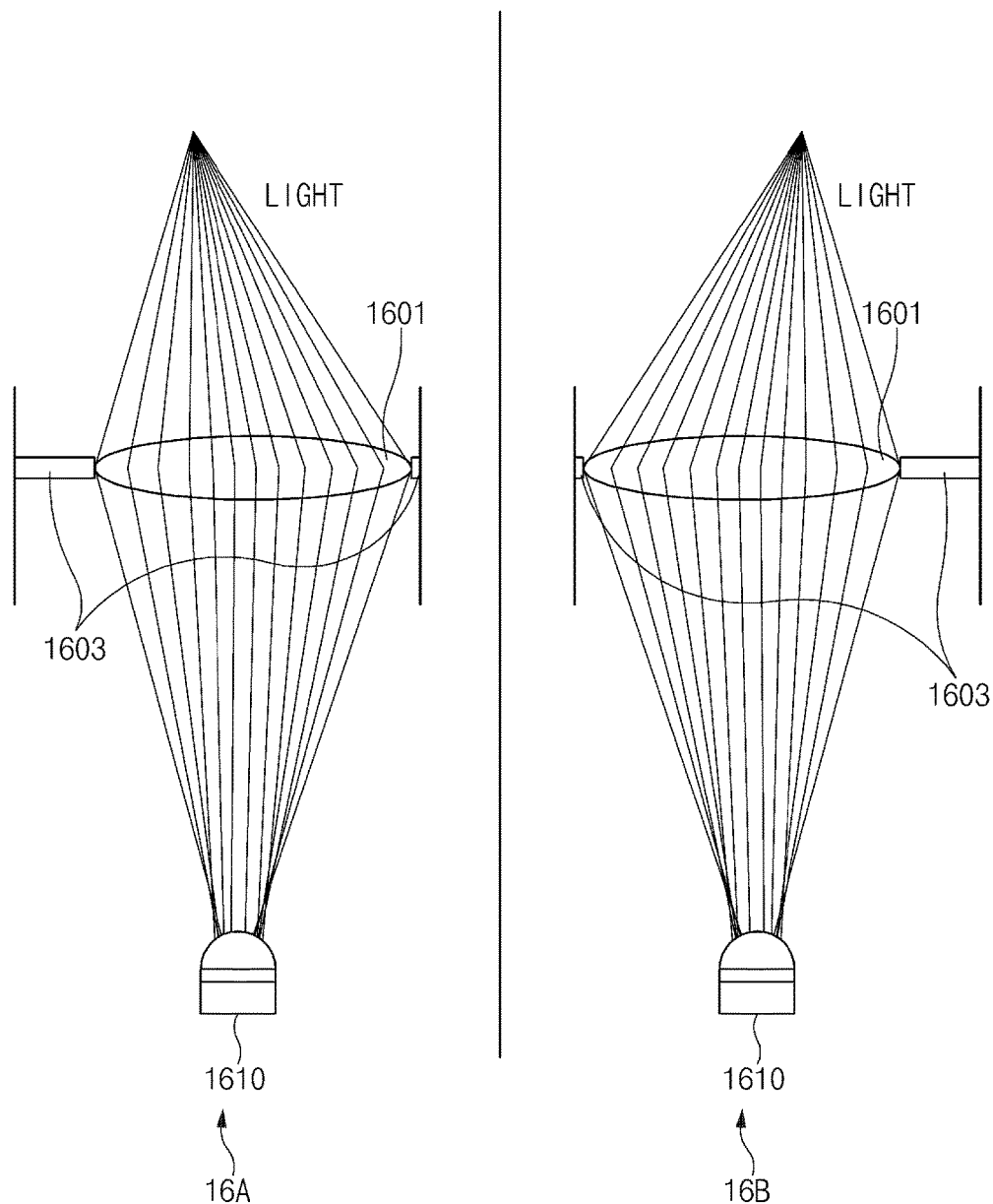
FIG. 16 is a diagram illustrating an example method for acquiring a phase difference image using an OIS driver module, according to an example embodiment.

As another example, the image processor 450 may acquire the first image and the second image by adjusting the arrangement of the lens 411 or the image sensor 413 (or the pixel array of the image sensor 413) by using the OIS driver module 415-1 and 415-2 (refer, for example, to FIG. 16).

According to an embodiment, the image processor 450 may normalize pixel values included in the first image and pixel values included in the second image in units of a pixel. The pixel value may have, for example, a range of 0 to 255. The pixel value may, for example, be referred to as "pixel intensity", a "pixel intensity value", and the like.

For example, in a pixel "X" of the pixel array of the image sensor 413, it is assumed that a pixel value of the first photoelectric element is "L" and a pixel value of the second photoelectric element is "R". In this case, a pixel value of the pixel "X" included in the first image is "L", and a pixel value of the pixel "X" included in the second image is "R". If the image processor 450 normalizes the first image and the second image, a pixel value of the pixel "X" of the normalized first image is "L/(L+R)", and a pixel value of the pixel "X" of the normalized second image is "R/(L+R)". As in the above description, the image processor 450 may perform normalization on a plurality of pixels included in the pixel array of the image sensor 413. As such, the image processor 450 may derive the normalized first image (or the first image having a normalized pixel value) and the normalized second image (or the second image having a normalized pixel value).

According to various embodiments, before the image processor 450 performs the normalization, the image processor 450 may exclude a pixel value, of which reliability is determined as being lower than a specified reference, from among pixel values included in the first image and pixel values included in the second image. For example, the image processor 450 may determine a pixel value that is saturated or is lower than a specified value, as a pixel value of low reliability.

According to an embodiment, the image processor 450 may extract a parameter (K-parameter) associated with tendency of changes in the normalized pixel values and may verify a light source of light reflected by a subject or a light source of light produced from the subject. For example, on the basis of the K-parameter, the image processor 450 may verify a type or a color temperature of a light source of light applied to a subject or may verify a type or a color temperature of a light source of light produced from the subject.

According to an embodiment, the image processor 450 may verify a color temperature of a light source of light reflected by a subject or a color temperature of a light source of light produced from the subject, by comparing the K-parameter and data (e.g., LUT formatted K-parameter data 441) stored in the memory 440. Alternatively, the image processor 450 may verify a type of a light source of light reflected by a subject or a type of a light source of light produced from the subject, by comparing the K-parameter and data stored in the memory 440.

According to an embodiment, the image processor 450 may perform white balancing based on the verified light source. For example, the image processor 450 may acquire WB correction data, which corresponds to the verified light source, of the LUT formatted WB correction data 442 stored in the memory 440. The image processor 450 may perform white balancing by using the acquired WB correction data.

The image processor 450 is illustrated in FIG. 4 as being independent of the processor 460. However, according to various example embodiments, the image processor 450 may be integrated in one (e.g., one-chip) with the processor 460.

The processor 460 may include various processing circuitry, such as, for example, and without limitation, one or more of a dedicated processor, a central processing unit (CPU), an application processor (AP), or a communication processor (CP). The processor 460 may perform, for example, data processing or an operation associated with control and/or communication of at least one other component included in the electronic device 401.

The display 470 may include, for example, a liquid crystal display (LCD), a light-emitting diode (LED) display, an organic light-emitting diode (OLED) display, a microelectromechanical systems (MEMS) display, an electronic paper display, or the like, but is not limited thereto. The display may display, for example, an image taken through the camera module 410, an image of which white balance is corrected by the image processor 450, and the like.

According to various example embodiments, the display 470 may include a touch screen and may receive, for example, a touch, gesture, proximity, or a hovering input by using an electronic pen or a part of a user's body.

Figure 5:
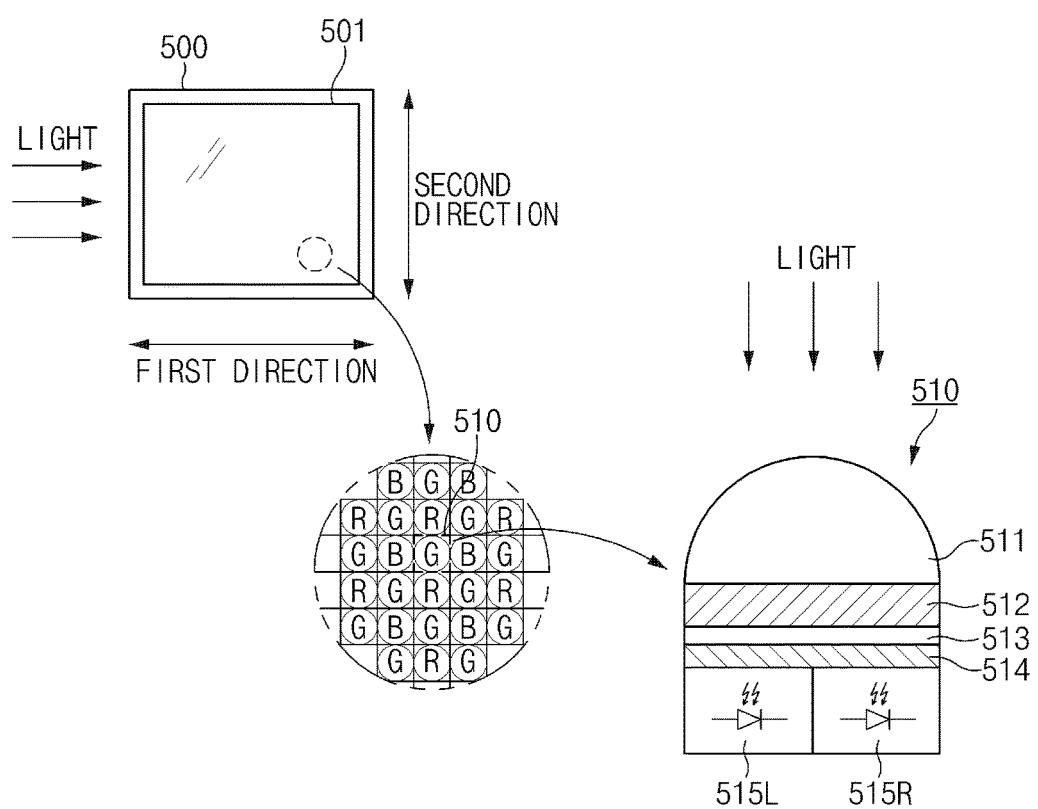
FIG. 5 is a diagram illustrating an example configuration of an image sensor, according to an example embodiment.

FIG. 5 is a diagram illustrating an example configuration of the image sensor, according to an example embodiment.

Referring to FIG. 5, an image sensor 500 may include a pixel array 501. For example, the image sensor 500 may correspond to the image sensor 413 illustrated in FIG. 4.

The pixel array 501 included in the image sensor 500 may include a plurality (e.g., millions to tens of millions) of pixels. Hundreds or thousands of pixels may be disposed in a first direction (e.g., a horizontal direction) of the pixel value 501, and likewise, hundreds or thousands of pixels may be disposed in a second direction (e.g., a vertical direction) of the pixel value 501.

According to an example embodiment, a specified predetermined color (or color channel) may be allocated to each of the plurality of pixels included in the pixel array 501. For example, the predetermined color may include (R, G, B), (R, Gr, Gb, B), or (R, G, B, W). The plurality of pixels may receive incident light through a lens (e.g., the lens 411 of FIG. 4). Each of the plurality of pixels may convert light having the allocated predetermined color into a pixel value that is an electrical signal.

The plurality of pixels may be implemented such that one unit image sensor ("pixel" and "unit image sensor" which may be used interchangeably) is disposed. For example, one unit image sensor 510 may be disposed in the pixel 510 to which a green color "G" is allocated.

According to an embodiment, the unit image sensor 510 may include a micro lens 511, various films or filters 512 to 514, a first photoelectric element (or a first photodetector) 515L, and a second photoelectric element (or a second photodetector) 515R. Although not illustrated in FIG. 5, the unit image sensor 510 may further include any other component, such as a conductive pattern, a high refractive pattern, or the like, which electrically connects the photoelectric elements 515L and 515R and the image processor 450.

The micro lens 511 may adjust a path of light incident on the micro lens 511 to allow the incident light to arrive at the first photoelectric element 515L and the second photoelectric element 515R.

An infra-red cut filter 512 may block at least a portion of infra-red rays of light incident through the micro lens 511. For example, the infra-red cut filter 512 may prevent and/or reduce over-exposure in the daytime when a light source is sufficient. On the other hand, the infra-red cut filter 512 may be automatically removed at night.

A color filter 513 may allow light of a specified predetermined color (or color channel) to pass. For example, the predetermined color may include R, G, B, or R, Gr, Gb, B, or R, G, B, W. For example, the color filter 513 may, for example, include a Bayer pattern including a red filter, a green filter, and a blue filter.

An antireflection layer 514 may increase the amount of incident light arriving at the first photoelectric element 515L and the second photoelectric element 515R by preventing light incident through the micro lens 511 from being reflected.

Each of the first photoelectric element 515L and the second photoelectric element 515R may correspond to a photo diode that is formed on a semiconductor substrate, for example. Each of the first photoelectric element 515L and the second photoelectric element 515R may produce charges according to the intensity of received light, by the photoelectric effect. A pixel value may be determined based on the amount of charges. According to various embodiments, the photoelectric elements 515L and 515R may be also referred to as an "imaging device".

Also, the two photoelectric elements 515L and 515R are illustrated in FIG. 5 as being disposed at one pixel (or one unit image sensor). However, embodiments of the present disclosure may not be limited thereto. According to various example embodiments, one photoelectric element or two or more photoelectric elements may be disposed. A pixel in which two or more photoelectric elements are disposed may be referred to as a "multi-pixel", and a pixel in which two photoelectric elements are disposed may be referred to as a "dual pixel".

Figure 6:
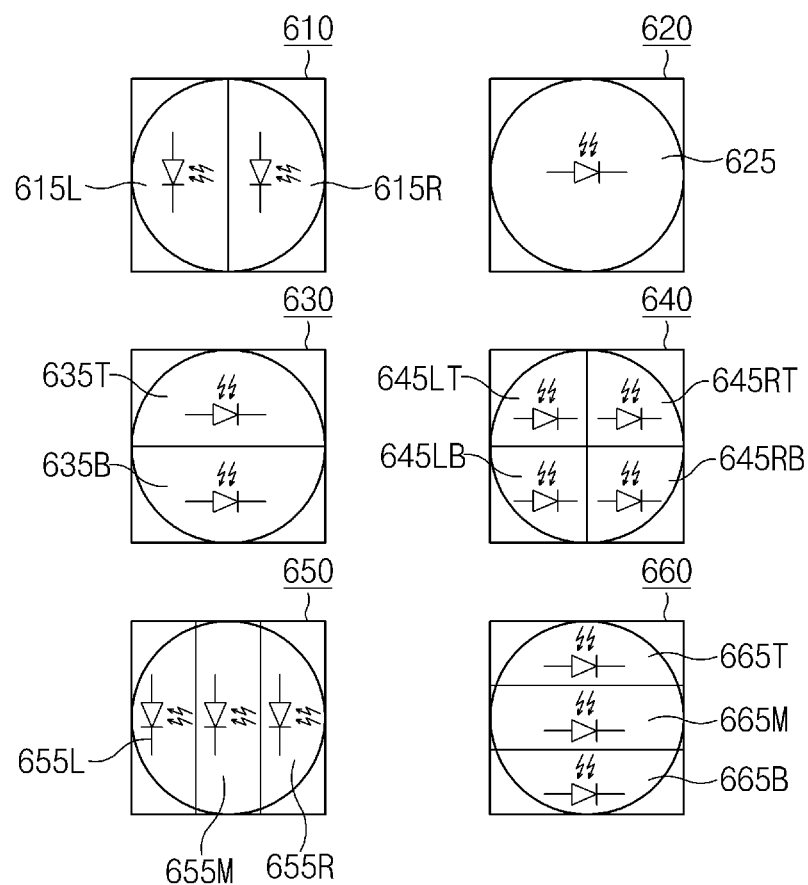
FIG. 6 is a diagram illustrating example layouts of photoelectric elements, according to various example embodiments.

FIG. 6 is a diagram illustrating various example layouts of photoelectric elements, according to various example embodiments.

Referring to FIG. 6, unit image sensors 610 to 660 in which photoelectric elements according to various embodiments are disposed are illustrated. Various types of unit image sensors 610 to 660 illustrated in FIG. 6 may be included in plurality in the pixel array of the image sensor 413 of FIG. 4, for example. According to various example embodiments, the arrangement of photoelectric elements illustrated in FIG. 6 is exemplified, but embodiments of the present disclosure may not be limited thereto.

According to an embodiment, a first photoelectric element 615L and a second photoelectric element 615R that are disposed horizontally may be included in one pixel 610 (or one unit image sensor). The horizontally disposed photoelectric elements 615L and 615R may receive light of different phases in a horizontal direction to generate a first image and a second image with respect to the same subject.

According to another embodiment, a first photoelectric element 635T and a second photoelectric element 635B that are disposed vertically may be included in one pixel 630. The vertically disposed photoelectric elements 635T and 635B may receive light of different phases in a vertical direction to generate a first image and a second image with respect to the same subject.

According to an embodiment, a single photoelectric element 625 may be included in one pixel 620. The single photoelectric element 625 may generate a first image and a second image with respect to the same subject at a time interval. For example, after the single photoelectric element 625 generates a first image, the single photoelectric element 625 may generate a second image having a phase different from the first image by adjusting an aperture (refer to FIG. 15). As another example, after the single photoelectric element 625 generates a first image, the single photoelectric element 625 may generate a second image having a phase different from the first image by adjusting the arrangement of a lens or an image sensor (or a pixel array of the image sensor) (refer to FIG. 16).

According to another embodiment, a first photoelectric element 645LT disposed at the left top, a second photoelectric element 645RT disposed at the right top, a third photoelectric element 645LB disposed at the left bottom, and a fourth photoelectric element 645RB disposed at the right bottom may be included in one pixel 640. The four photoelectric elements 645LT, 645RT, 645LB, and 645RB may contribute to generate a first image, a second image, a third image, and a fourth image respectively having different phase differences with respect to the same subject.

According to another embodiment, a first photoelectric element 655L disposed on the left, a second photoelectric element 655M disposed in the middle, and a third photoelectric element 655R disposed on the right may be included in one pixel 650. The three photoelectric elements 655L, 655M, and 655R may contribute to generate a first image, a second image, and a third image respectively having phase differences with respect to the same subject.

According to another embodiment, a first photoelectric element 665T, a second photoelectric element 665M, and a third photoelectric element 655B that are respectively disposed on the top, in the middle, and on the bottom along a vertical direction may be included in one pixel 660. The three photoelectric elements 665T, 665M, and 655B may contribute to generate a first image, a second image, and a third image respectively having phase differences with respect to the same subject.

FIG. 7 is a diagram illustrating an example method for acquiring a phase difference image, according to an example embodiment.

Referring to FIG. 7, a lens 701 (corresponding, for example, to the lens 411 of FIG. 4) focusing light and a pixel array 702 of an image sensor including a plurality of pixels are illustrated. A unit image sensor (e.g., 710-1, 710-2, or 710-3) may be included in each of the plurality of pixels included in the pixel array 702. In FIG. 7, two photoelectric elements 715L and 715R included in the unit image sensor 710-1 may have arrangement corresponding, for example, to arrangement of the first photoelectric element 615L and the second photoelectric element 615R illustrated in FIG. 6, for example.

According to an example embodiment, light, which corresponds to a first group of optical paths, of light incident on the lens 701 may be refracted after passing through a first area 710L of the lens 701. The light corresponding to the first group of optical paths may arrive at the first photoelectric element 715L of the unit image sensor 710-1 of the pixel array 702. Meanwhile, light, which corresponds to a second group of optical paths (having phase difference with the first group of optical paths), of the light incident on the lens 701 may be refracted after passing through a second area 710R of the lens 701. The light corresponding to the second group of optical paths may arrive at the second photoelectric element 715R of the unit image sensor 710-1 of the pixel array 702.

Each of the first photoelectric element 715L and the second photoelectric element 715R of the unit image sensor 710-1 may generate a pixel value corresponding to the intensity of received light. The generation of the pixel value in the unit image sensor 710-1 may be performed similarly in a plurality of pixels (e.g., 710-2 and 710-3) included in the pixel array 702. Pixel values of the first photoelectric elements 715L generated in the plurality of pixels may form a first image, and pixel values of the second photoelectric elements 715R generated in the plurality of pixels may form a second image.

In the above-described case, the first image and the second image may be generated based on light reflected from the same subject or light produced from the same subject. In the first image and the second image, shading or vignetting due to the insufficient intensity of radiation may be generated in the vicinity of an edge because of an inherent characteristic of a lens. The "shading" may be markedly generated as pixel values of pixels in the vicinity of an edge of the pixel array decrease and may be generated in a pattern that varies with wavelengths of light such as R, G, B, and the like.

Meanwhile, according to an example embodiment, in the plurality of pixels included in the pixel array 702, a ratio of occupied areas (or exposed areas) of a first photoelectric element and a second photoelectric element included in each pixel may change. The ratio of occupied areas may change with a location at which each pixel is disposed on the pixel array 702 (in consideration of influence by "shading"), a predetermined color (e.g., R, G, or B) allocated to a color filter of each pixel, a specification of a camera module or an electronic device, and the like. It may be possible to adjust an optical location (exit pupil) at which light is focused, through adjusting the ratio of occupied areas. The ratio of occupied areas may be used for calibration of K-parameter data and WB correction data stored in a memory.

For example, in the pixel 710-1, a ratio of an occupied area of a photoelectric element disposed in an "R" area may be higher than a ratio of an occupied area of a photoelectric element disposed in an "L" area. As another example, in the pixel 710-2, a ratio of an occupied area of a photoelectric element disposed in an "R" area and a ratio of an occupied area of a photoelectric element disposed in an "L" area are almost the same; in the pixel 710-3, a ratio of an occupied area of a photoelectric element disposed in an "R" area may be lower than a ratio of an occupied area of a photoelectric element disposed in an "L" area.

Figure 8:
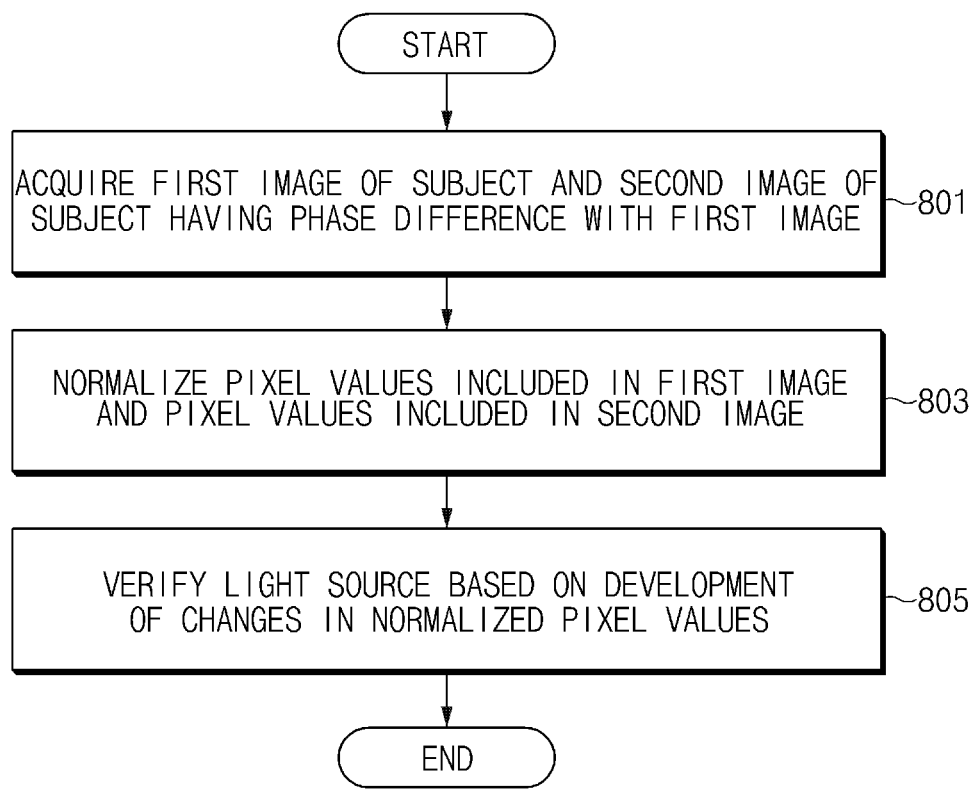
FIG. 8 is a flowchart illustrating an example light source verifying method according to an example embodiment.

FIG. 8 is a flowchart illustrating an example light source verifying method, according to an example embodiment.

Referring to FIG. 8, the light source verifying method according to an example embodiment may include operation 801 to operation 805. Operation 801 to operation 805 may be performed by, for example, the electronic device 401 illustrated in FIG. 4. For example, operation 801 to operation 805 may be respectively implemented with instructions that are capable of being performed (or executed) by the image processor 450 of the electronic device 401. The instructions may be stored in, for example, a computer-readable recording medium or the memory 480 of the electronic device 401. Below, operation 801 to operation 805 may be described by using the reference numerals of FIG. 4.

In operation 801, the image processor 450 of the electronic device 401 may acquire a first image of a subject generated based on a first group of optical paths and a second image of the subject generated based on a second group of optical paths having a phase difference with the first group of optical paths from the image sensor 413.

In operation 803, the image processor 450 may normalize pixel values included in the first image and pixel values included in the second image in units of a pixel.

In operation 805, the image processor 450 may verify a light source of light reflected by a subject or a light source of light produced from the subject, based on a parameter (K-parameter) associated with tendency of changes in the normalized pixel values. For example, the image processor 450 may verify a type or a color temperature of a light source of light applied to the subject or a type or a color temperature of a light source of light produced from the subject.

According to an embodiment, in operation 805, the image processor 450 may verify a type or a color temperature of a light source of light reflected by the subject or produced from the subject, by comparing data (e.g., the K-parameter LUT data), which are stored in the memory 440 in advance, and the K-parameter.

Figure 9:
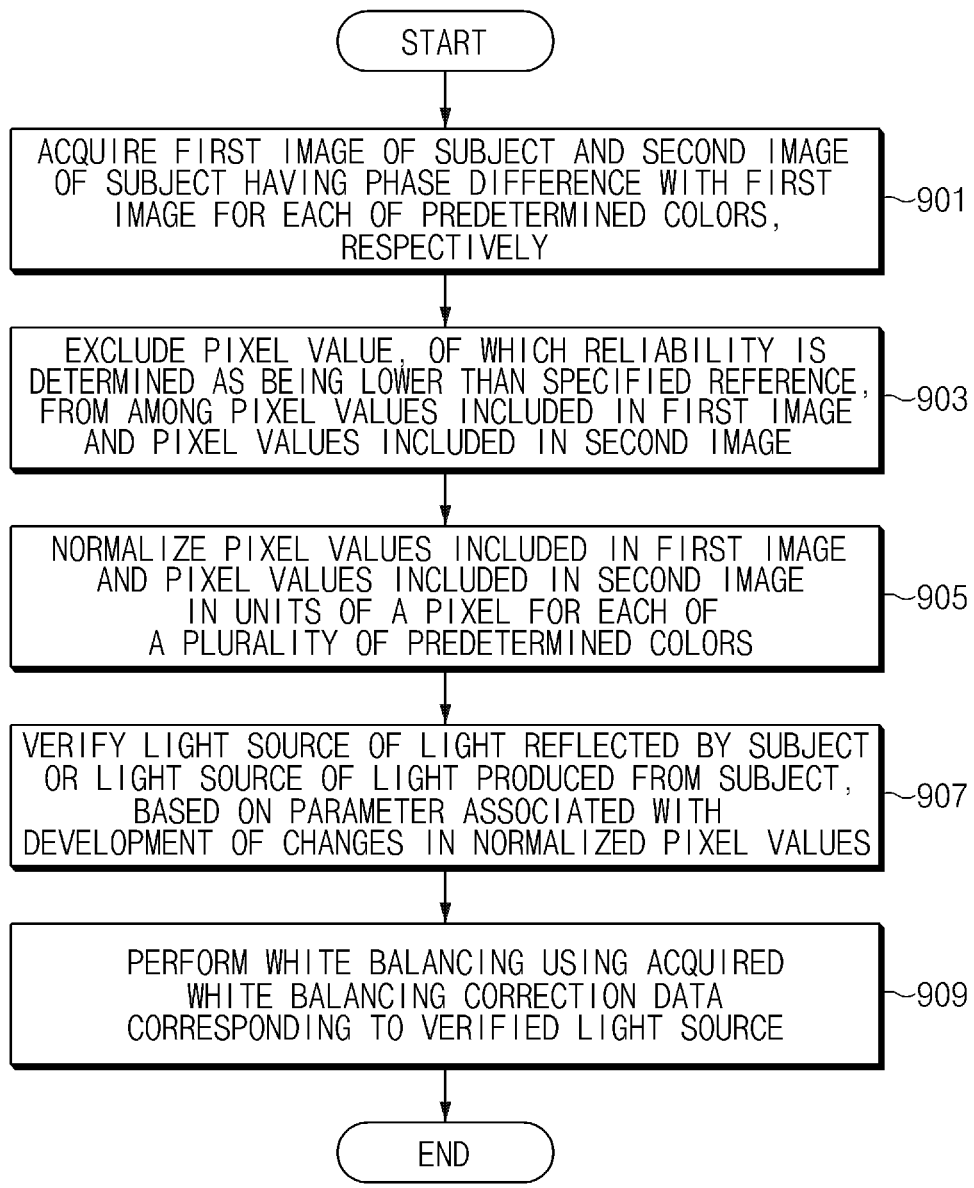
FIG. 9 is a flowchart illustrating an example light source verifying method according to another example embodiment.

FIG. 9 is a flowchart illustrating an example light source verifying method, according to another example embodiment. FIGS. 10 to 14 may be referenced to aid in description of the light source verifying method.

Referring to FIG. 9, the light source verifying method according to an example embodiment may include operation 901 to operation 909. Operation 901 to operation 909 may be performed by, for example, the electronic device 401 illustrated in FIG. 4. For example, operation 901 to operation 909 may be respectively implemented with instructions that are capable of being performed (or executed) by the image processor 450 of the electronic device 401. The instructions may be stored in, for example, the memory 480 of the electronic device 401. Reference numerals of FIG. 4 are used to describe FIG. 9, and it is assumed that two photoelectric elements are included in one pixel as illustrated in FIG. 5. For ease of description, also, FIG. 9 and FIGS. 10 to 14 will be referenced alternately.

In operation 901, the image processor 450 of the electronic device 401 may acquire a first image of a subject generated based on a first group of optical paths and a second image of the subject generated based on a second group of optical paths having a phase difference with the first group of optical paths from the image sensor 413 for each of a plurality of predetermined colors (e.g., R, Gr, Gb, and B).

For example, referring to FIG. 10, the electronic device 401 may take a picture of a subject 1000 below an incandescent lamp using the camera module 410. If the subject 1000 is taken, the image processor 450 of the electronic device 401 may acquire a first image of a subject generated based on a first group of optical paths and a second image of the subject generated based on a second group of optical paths having a phase difference with the first group of optical paths from the image sensor 413 for each of a plurality of predetermined colors (e.g., R, Gr, Gb, and B). As such, a first image of an R color, a first image of a Gr color, a first image of a Gb color, and a first image of a B color may be acquired, and the first images may be referred to as a "first image group". As in the above description, a second image of an R color, a second image of a Gr color, a second image of a Gb color, and a second image of a B color may be acquired, and the second images may be referred to as a "second image group".

Figure 10:
FIG. 10 is an image illustrating a subject, according to an example embodiment.
Figure 11:
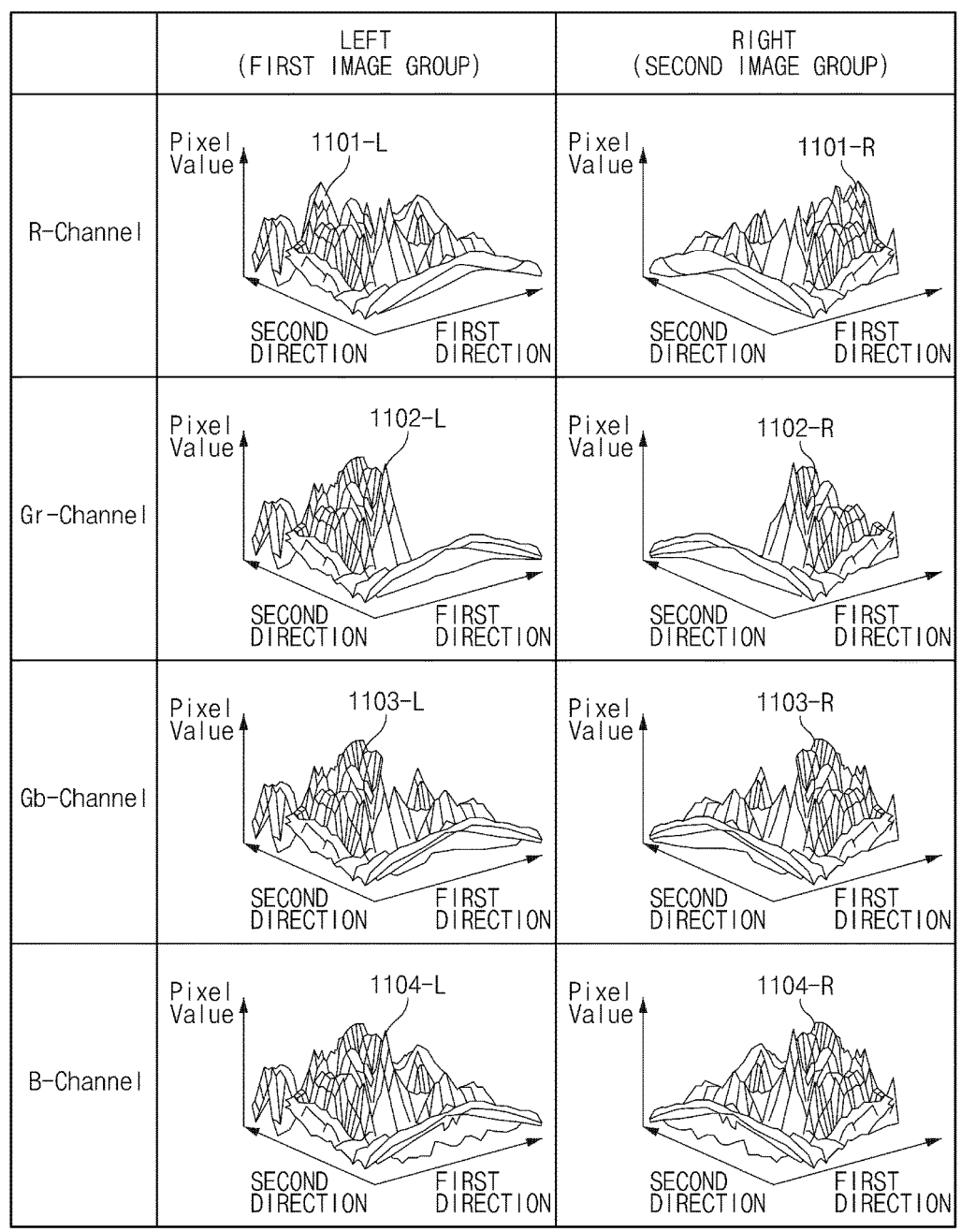
FIG. 11 is a graph illustrating an example in which pixel values of a first image group and a second image group are plotted three-dimensionally, according to an example embodiment.

Referring to FIG. 11, pixel values of the first image group and the second image group that are associated with the subject 1000 of FIG. 10 are three-dimensionally illustrated for each predetermined color. In each graph, a first direction may correspond to a horizontal direction of the pixel array included in the image sensor 413, and a second direction may correspond to a vertical direction of the pixel array.

For example, in the first image group, first image pixel values 1101-L of the R color R-channel, first image pixel values 1102-L of the Gr color Gr-channel, first image pixel values 1103-L of the Gb color Gb-channel, and first image pixel values 1104-L of the B color B-channel may be high in common on a left side of the first direction in consideration of tendency of changes in pixel values.

Also, for example, in the second image group, second image pixel values 1101-R of the R color R-channel, second image pixel values 1102-R of the Gr color Gr-channel, second image pixel values 1103-R of the Gb color Gb-channel, and second image pixel values 1104-R of the B color B-channel may be high in common on a right side of the first direction in consideration of tendency of changes in pixel values.

Referring to graphs of the first image group and the second image group, it may be verified that each image has a unique pattern due to a configuration of the subject 1000 of FIG. 10, a predetermined color (or channel), and a phase difference. Also, on a right side of the first direction in the first image group and on a left side of the second direction in the second image group, it may be verified that pixel values are low due to shading or vignetting that is generated because of the insufficient intensity of radiation.

In operation 903 of FIG. 9, the image processor 450 of the electronic device 401 may exclude a pixel value, of which reliability is determined as being lower than a specified reference, from among pixel values included in the first image and pixel values included in the second image. For example, the image processor 450 may determine a pixel value, which is saturated or is lower than a specified value, as a pixel value of low reliability and may exclude the determined pixel value.

For example, in each image of the first image group and the second image group illustrated in FIG. 11, pixel values of pixels, of which reliability is low, may be excluded before normalization is performed.

In operation 905 of FIG. 9, the image processor 450 of the electronic device 401 may normalize pixel values included in the first image group and pixel values included in the second image group in units of a pixel for each of a plurality of predetermined colors (e.g., R, Gr, Gb, and B).

Figure 12:
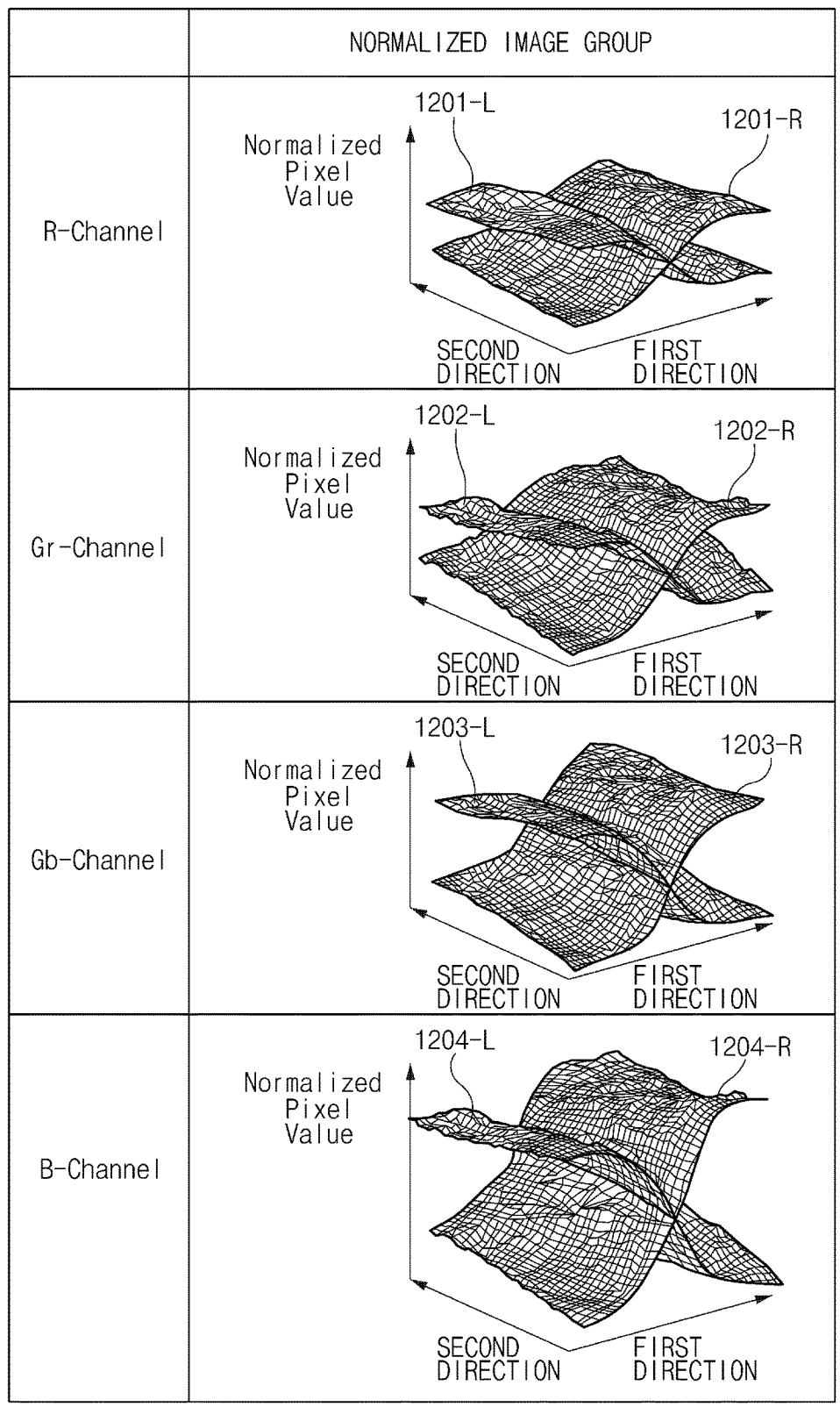
FIG. 12 is a graph illustrating an example in which normalized pixel values of the first image group and the second image group are plotted three-dimensionally, according to an example embodiment.

For example, referring to FIG. 12, graphs in which pixel values normalized for each of predetermined colors R, Gr, Gb, and B are three-dimensionally plotted are illustrated. For example, if the first image pixel values 1101-L of the R color R-channel and the second image pixel values 1101-R of the R color R-channel illustrated in FIG. 11 are normalized, normalized pixel values 1201-L and 1201-R of the R color R-channel illustrated in FIG. 12 may be derived. As in the above description, if the first image pixel values 1102-L of the Gr color Gr-channel and the second image pixel values 1102-R of the Gr color Gr-channel illustrated in FIG. 11 are normalized, normalized pixel values 1202-L and 1202-R of the Gr color Gr-channel illustrated in FIG. 12 may be derived. Also, if the first image pixel values 1103-L of the Gb color Gb-channel and the second image pixel values 1103-R of the Gb color Gb-channel illustrated in FIG. 11 are normalized, normalized pixel values 1203-L and 1203-R of the Gb color Gb-channel illustrated in FIG. 12 may be derived. In addition, if the first image pixel values 1104-L of the B color B-channel and the second image pixel values 1104-R of the B color B-channel illustrated in FIG. 11 are normalized, normalized pixel values 1204-L and 1204-R of the B color B-channel illustrated in FIG. 12 may be derived.

Looking at the normalized pixel values of each color (or channel) illustrated in FIG. 12, unlike FIG. 11, it may be verified that a pattern unique to the subject 1000 disappears. In addition, it may be verified that tendency of changes in normalized pixel values of each color (or channel) varies somewhat for each channel.

In operation 907 of FIG. 9, the image processor 450 of the electronic device 450 may verify a light source of light reflected by a subject or a light source of light produced from the subject, based on a parameter (K-parameter) associated with tendency of changes in the normalized pixel values. For example, the image processor 450 may verify a type or a color temperature of a light source.

Figure 13:
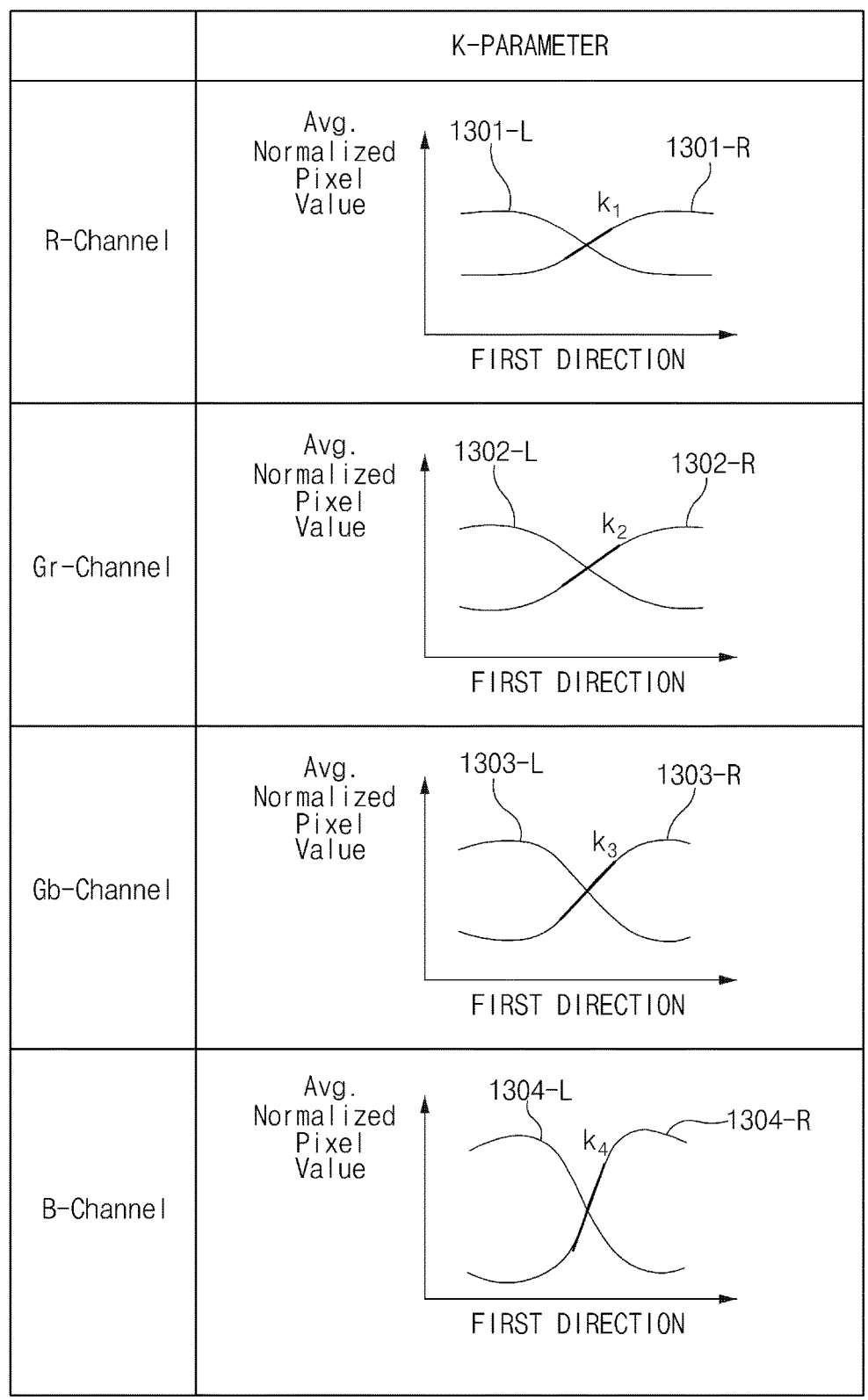
FIG. 13 is a graph illustrating an example of deriving of a K-parameter, according to an example embodiment.

For example, referring to FIG. 13, graphs for deriving the K-parameter are illustrated. For example, if an average of the normalized pixel values 1201-L and 1201-R of the R color (R-channel) illustrated in FIG. 12 is taken in the second direction, average graphs 1301-L and 1301-R of the normalized pixel values of FIG. 13 may be derived. In this case, a rate of change k1 of the graph 1301-R at an intersection of the graph 1301-L and the graph 1301-R may be a part of the K-parameter.

As in the above description, if an average of the normalized pixel values 1202-L and 1202-R of the Gr color (Gr-channel) illustrated in FIG. 12 is taken in the second direction, average graphs 1302-L and 1302-R of the normalized pixel values of FIG. 13 may be derived. In this case, a rate of change k2 of the graph 1302-R at an intersection of the graph 1302-L and the graph 1302-R may be a part of the K-parameter.

Also, if an average of the normalized pixel values 1203-L and 1203-R of the Gb color (Gb-channel) illustrated in FIG. 12 is taken in the second direction, average graphs 1303-L and 1303-R of the normalized pixel values of FIG. 13 may be derived. In this case, a rate of change k3 of the graph 1303-R at an intersection of the graph 1303-L and the graph 1303-R may be a part of the K-parameter.

Also, if an average of the normalized pixel values 1204-L and 1204-R of the B color (B-channel) illustrated in FIG. 12 is taken in the second direction, average graphs 1304-L and 1304-R of the normalized pixel values of FIG. 13 may be derived. In this case, a rate of change k4 of the graph 1304-R at an intersection of the graph 1304-L and the graph 1304-R may be a part of the K-parameter.

For example, in the example embodiment, the K-parameter may be {k1, k2, k3, k4}. The image processor 450 of the electronic device 401 may verify a type or a color temperature of a light source of light reflected by the subject or produced from the subject, by comparing data (e.g., the K-parameter LUT data), which are stored in the memory 440 in advance, and the derived K-parameter.

According to various example embodiments, the k1, k2, k3, and k4 may respectively take rates of change of the graphs 1301-L, 1302-L, 1303-L, and 1304-L at intersections of the graphs 1301-L, 1302-L, 1303-L, and 1304-L and the graphs 1301-R, 1302-R, 1303-R, and 1304-R. Alternatively, according to various embodiments, the k1, k2, k3, and k4 may respectively take averages of absolute values of rates of change of the graphs 1301-L, 1302-L, 1303-L, and 1304-L and absolute values of rates of change of the graphs 1301-R, 1302-R, 1303-R, and 1304-R at intersections of the graphs 1301-L, 1302-L, 1303-L, and 1304-L and the graphs 1301-R, 1302-R, 1303-R, and 1304-R. In addition, points at which the rates of change are taken may not be limited to points at which the graphs 1301-L, 1302-L, 1303-L, and 1304-L and the graphs 1301-R, 1302-R, 1303-R, and 1304-R intersect.

Figure 14:
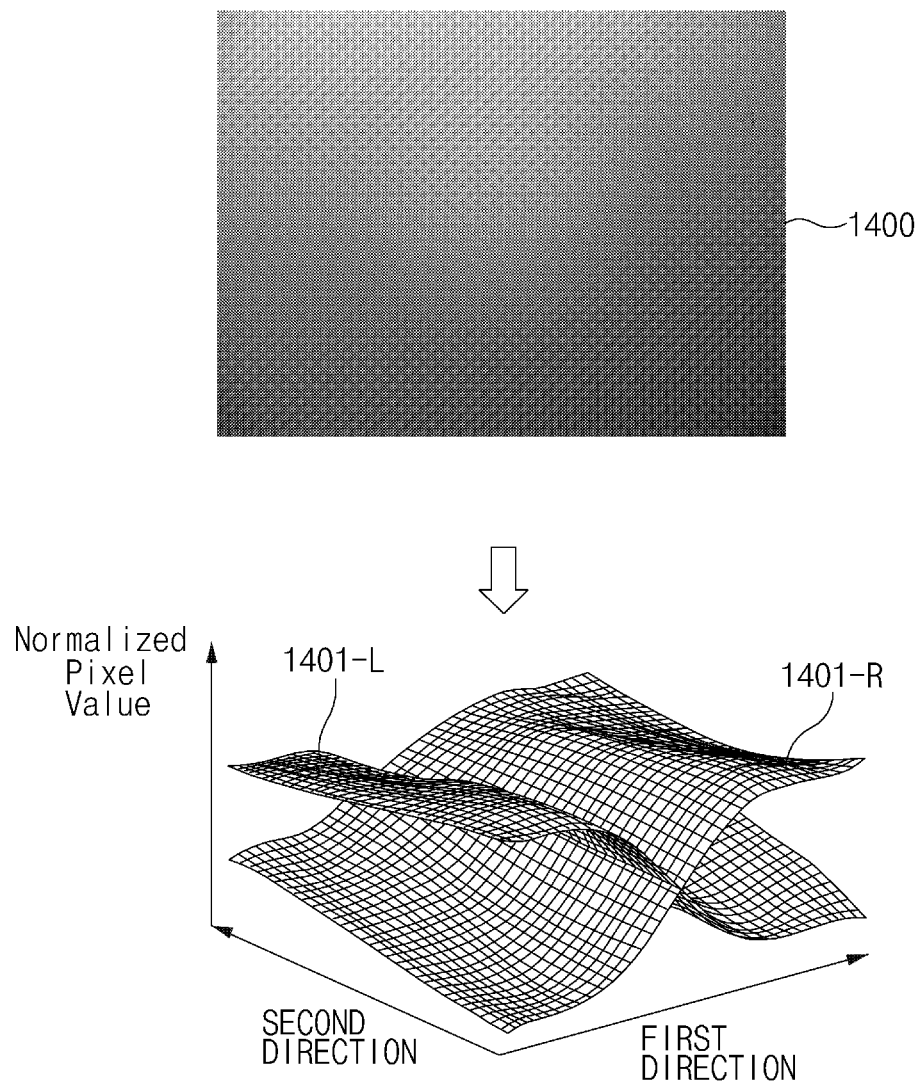
FIG. 14 is a diagram illustrating an example achromatic colored subject below an incandescent lamp and a three-dimensional graph of normalized pixel values when the achromatic colored subject was photographed.

With regard to the above description, referring to FIG. 14, for example, if an achromatic colored subject 1400 is photographed under an incandescent lamp condition, normalized pixel values of the R color R-channel are plotted as illustrated by graphs 1401-L and 1401-R. Pixel values of the graph 1401-L and the graph 1401-R may be completely different from pixel values of the first image group and the second image group of FIG. 11. However, it may be verified that tendency of changes in normalized pixel values of FIG. 11 is similar to tendency of changes in normalized pixel values of the image group of FIG. 12. Accordingly, if the K-parameter for each color (or channel) is in advance stored in the memory 440 to correspond to a type (or color temperature) of a specified light source, it may be possible to verify (or estimate) a light source through comparison with a K-parameter derived from a taken image.

In operation 909 of FIG. 9, the image processor 450 of the electronic device 401 may perform white balancing using acquired WB correction data corresponding to the verified light source. For example, the WB correction data may be included in the LUT formatted WB correction data 442 stored in the memory 440.

FIG. 15 is a diagram illustrating an example method for acquiring a phase difference image using an aperture, according to an example embodiment.

Referring to FIG. 15, a lens 1501 (corresponding to 411 of FIG. 4) focusing light, an aperture 1502 (corresponding to 412 of FIG. 4), and a unit image sensor (or pixel) 1510 are illustrated. A single photoelectric element may be included in the unit image sensor 1510.

In the case of 15A, the aperture 1502 may cover a right side of the lens 1501, that is, about half of the lens 1501. In this case, only light, which corresponds to a partial left side, of the light focused by the lens 1501 may pass through the lens 1501. The light of the partial left side may form a uniform optical path group and may arrive at the single photoelectric element included in the unit image sensor 1510.

In the case of 15B, the aperture 1502 may cover about half a left side of the lens 1501. In this case, only light, which corresponds to a partial right side, of the light focused by the lens 1501 may pass through the lens 1501. The light of the partial left side may form a uniform optical path group having a phase difference with the optical path group of 15A and may arrive at the single photoelectric element included in the unit image sensor 1510.

According to the example embodiment of FIG. 15, even though the unit image sensor 1510 includes only the single photoelectric element, through photographing at a time interval, the unit image sensor 1510 may generate a first image and a second image, which have different phase differences, with respect to the same subject.

FIG. 16 is a diagram illustrating an example method for acquiring a phase difference image using an OIS driver module, according to an example embodiment.

Referring to FIG. 16, a lens 1601 (corresponding to 411 of FIG. 4) focusing light, an OIS driver module 1603 (corresponding to 415-1 of FIG. 4), and a unit image sensor (or pixel) 1610 are illustrated. A single photoelectric element may be included in the unit image sensor 1610.

In the case of 16A, an OIS driver module 1603 may move the lens 1601 to the right. In this case, light focused through the lens 1601 may correspond to light biased relatively to the right. The right biased light may form a uniform optical path group and may arrive at the single photoelectric element included in the unit image sensor 1610.

Meanwhile, in the case of 16B, the OIS driver module 1603 may move the lens 1601 to the left. In this case, light focused through the lens 1601 may correspond to light biased relatively to the left. The left biased light may form a uniform optical path group having a phase difference with the optical path group of 16A and may arrive at the single photoelectric element included in the unit image sensor 1610.

According to the example embodiment of FIG. 16, even though the unit image sensor 1610 includes only the single photoelectric element, through photographing at a time interval, the unit image sensor 1610 may generate a first image and a second image, which have different phase differences, with respect to the same subject.

Figure 17:
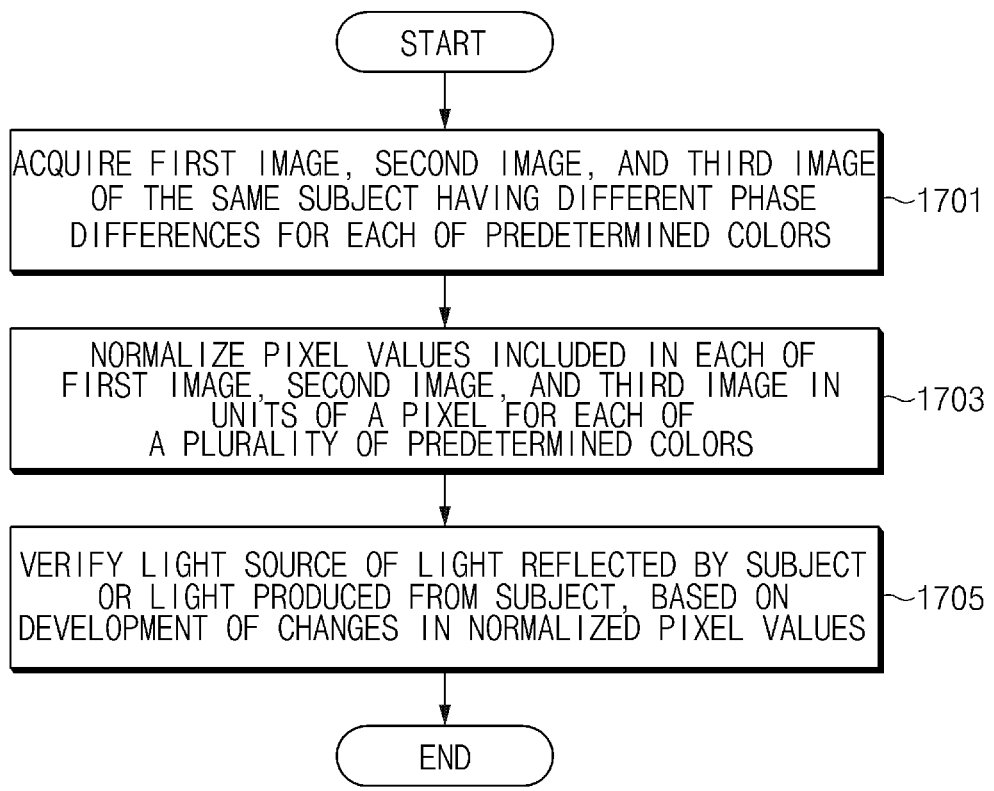
FIG. 17 is a flowchart illustrating an example light source verifying method according to another example embodiment.
Figure 18:
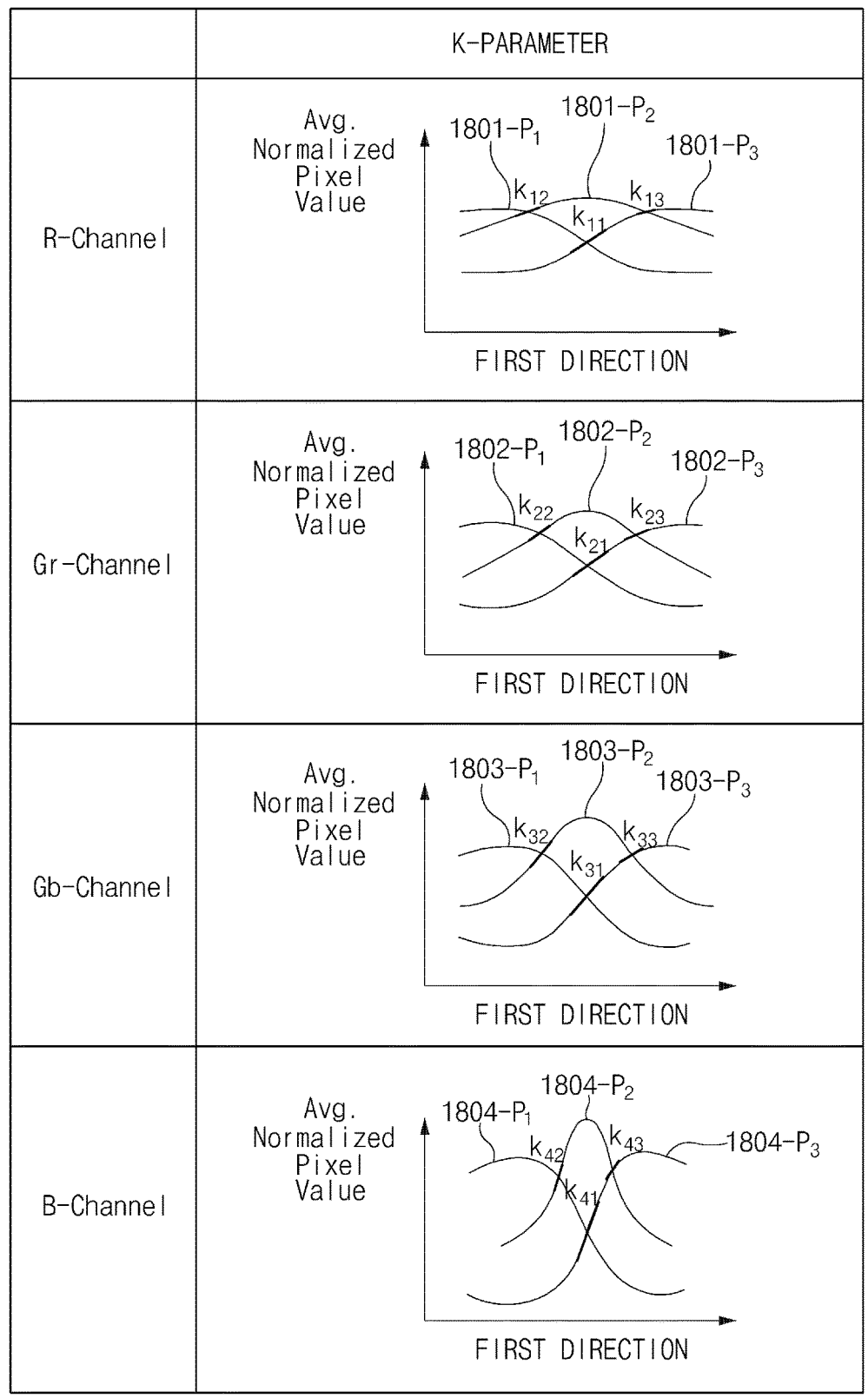
FIG. 18 is a graph illustrating an example of deriving of the K-parameter, according to another example embodiment.

FIG. 17 is a flowchart illustrating an example light source verifying method, according to another example embodiment. FIG. 18 may be referenced to aid in describing the light source verifying method illustrated in FIG. 17.

Referring to FIG. 17, the light source verifying method according to an example embodiment may include operation 1701 to operation 1705. Operation 1701 to operation 1705 may be performed by, for example, the electronic device 401 illustrated in FIG. 4. For example, operation 1701 to operation 1705 may be respectively implemented with instructions that are capable of being performed (or executed) by the image processor 450 of the electronic device 401. The instructions may be stored in, for example, the memory 480 of the electronic device 401. Reference numerals of FIG. 4 are used to describe FIG. 17, and it is assumed that three photoelectric elements are included in one pixel like the unit image sensors (or unit pixels) 650 and 660 of FIG. 6. For ease of description, also, other drawings including FIG. 18 will be referenced together.

In operation 1701, the image processor 450 of the electronic device 401 may acquire a first image of a subject generated based on a first group of optical paths, a second image of the subject generated based on a second group of optical paths, and a third image of the subject generated based on a third group of optical paths from the image sensor 413 for each of a plurality of predetermined colors (e.g., R, Gr, Gb, and B). The first group of optical paths, the second group of optical paths, and the third group of optical paths may have uniform phase differences from each other.

For example, the first image that is based on the first group of optical paths may be acquired by a plurality of first photoelectric elements 655L or 665T illustrated in FIG. 6, the second image that is based on the second group of optical paths may be acquired by a plurality of second photoelectric elements 655M or 665M illustrated in FIG. 6, and the third image that is based on the third group of optical paths may be acquired by a plurality of third photoelectric elements 655R or 665B illustrated in FIG. 6.

For example, the electronic device 401 may take a picture of the subject 1000 of FIG. 10 below an incandescent lamp using the camera module 410. If the subject 1000 is photographed, the image processor 450 of the electronic device 401 may acquire a first image of a subject generated based on a first group of optical paths, a second image of the subject generated based on a second group of optical paths, and a third image of the subject generated based on a third group of optical paths from the image sensor 413 for each of a plurality of predetermined colors (e.g., R, Gr, Gb, and B).

As such, a first image of an R color, a first image of a Gr color, a first image of a Gb color, and a first image of a B color may be acquired, and the first images may be referred to as a "first image group". As in the above description, a second image of an R color, a second image of a Gr color, a second image of a Gb color, and a second image of a B color may be acquired, and the second images may be referred to as a "second image group". Likewise, a third image of an R color, a third image of a Gr color, a third image of a Gb color, and a third image of a B color may be acquired, and the third images may be referred to as a "third image group".

In operation 1703, the image processor 450 of the electronic device 401 may normalize pixel values included in the first image group, the second image group, and the third image group in units of a pixel for each of a plurality of predetermined colors (e.g., R, Gr, Gb, and B). A pattern unique to the subject 1000 may disappear through the above-described normalization operation.

For example, in any one pixel of a pixel array, assuming that a pixel value of a first image of an R color R-channel is "$P_1$", a pixel value of a second image of the R color R-channel is "$P_2$", and a pixel value of a third image of the R color R-channel is "$P_3$", a normalized pixel value of the first image in the any one pixel may be "$P_1/(P_1+P_2+P_3)$", a normalized pixel value of the second image in the any one pixel may be "$P_2/(P_1+P_2+P_3)$", and a normalized pixel value of the third image in the any one pixel may be "$P_3/(P_1+P_2+P_3)$". The normalization operation may be similarly performed on a plurality of pixels included in the pixel array for each of predetermined colors (e.g., R, Gr, Gb, and B).

In operation 1705, the image processor 450 of the electronic device 450 may verify a light source of light reflected by a subject or a light source of light produced from the subject, based on a parameter (K-parameter) associated with tendency of changes in the normalized pixel values. For example, the image processor 450 may verify a type or a color temperature of a light source.

For example, referring to FIG. 18, graphs for deriving the K-parameter are illustrated. For example, FIG. 18 may indicate graphs corresponding to execution results of operations similar to the operations described with reference to FIGS. 12 and 13. That is, normalized image groups that are capable of being obtained in operation 1703 of FIG. 17 and being plotted three-dimensionally may result in a two-dimensional graph illustrated in FIG. 18 through an average in the second direction (or the first direction), for example.

For example, in the R color R-channel, an average graph (of a second direction) 1801-$P_1$ of normalized pixel values of the first image, an average graph 1801-$P_2$ of normalized pixel values of the second image, and an average graph 1801-$P_3$ of normalized pixel values of the third image may be plotted. In this case, a rate in change $k_{11}$ of the graph 1801-$P_3$ at an intersection of the graph 1801-$P_1$ and the graph 1801-$P_3$ may be specified. Also, a rate in change $k_{12}$ of the graph 1801-$P_2$ at an intersection of the graph 1801-$P_1$ and the graph 1801-$P_2$ may be specified, and a rate in change $k_{13}$ of the graph 1801-$P_3$ at an intersection of the graph 1801-$P_2$ and the graph 1801-$P_3$ may be specified. The $k_{11}$, $k_{12}$, and $k_{13}$ may be included as part of the K-parameter.

As in the above description, for example, in the Gr color Gr-channel, an average graph (of a second direction) 1802-$P_1$ of normalized pixel values of the first image, an average graph 1802-$P_2$ of normalized pixel values of the second image, and an average graph 1802-$P_3$ of normalized pixel values of the third image may be plotted. In this case, a rate in change $k_{21}$ of the graph 1802-$P_3$ at an intersection of the graph 1802-$P_1$ and the graph 1802-$P_3$ may be specified. Also, a rate in change $k_{22}$ of the graph 1802-$P_2$ at an intersection of the graph 1802-$P_1$ and the graph 1802-$P_2$ may be specified, and a rate in change $k_{23}$ of the graph 1802-$P_3$ at an intersection of the graph 1802-$P_2$ and the graph 1802-$P_3$ may be specified. The $k_{21}$, $k_{22}$, and $k_{23}$ may be included as part of the K-parameter.

As in the above description, for example, in the Gb color Gb-channel, an average graph (of a second direction) 1803-$P_1$ of normalized pixel values of the first image, an average graph 1803-$P_2$ of normalized pixel values of the second image, and an average graph 1803-$P_3$ of normalized pixel values of the third image may be plotted. In this case, a rate in change $k_{31}$ of the graph 1803-$P_3$ at an intersection of the graph 1803-$P_1$ and the graph 1803-$P_3$ may be specified. Also, a rate in change $k_{32}$ of the graph 1803-$P_2$ at an intersection of the graph 1803-$P_1$ and the graph 1803-$P_2$ may be specified, and a rate in change $k_{33}$ of the graph 1803-$P_3$ at an intersection of the graph 1802-$P_2$ and the graph 1803-$P_3$ may be specified. The $k_{31}$, $k_{32}$, and $k_{33}$ may be included as part of the K-parameter.

As in the above description, for example, in the B color B-channel, an average graph (of a second direction) 1804-$P_1$ of normalized pixel values of the first image, an average graph 1804-$P_2$ of normalized pixel values of the second image, and an average graph 1804-$P_3$ of normalized pixel values of the third image may be plotted. In this case, a rate in change $k_{41}$ of the graph 1804-$P_3$ at an intersection of the graph 1804-$P_1$ and the graph 1804-$P_3$ may be specified. Also, a rate in change $k_{42}$ of the graph 1804-$P_2$ at an intersection of the graph 1804-$P_1$ and the graph 1804-$P_2$ may be specified, and a rate in change $k_{43}$ of the graph 1804-$P_3$ at an intersection of the graph 1803-$P_2$ and the graph 1804-$P_3$ may be specified. The $k_{41}$, $k_{42}$, and $k_{43}$ may be included as part of the K-parameter.

That is, in the embodiment, the K-parameter may be $\{\{k_{11}, k_{12}, k_{13}\}, \{k_{21}, k_{22}, k_{23}\}, \{k_{31}, k_{32}, k_{33}\}, \{k_{41}, k_{42}, k_{43}\}\}$. The image processor 450 of the electronic device 401 may verify a type or a color temperature of a light source of light reflected by the subject or produced from the subject, by comparing data (e.g., the K-parameter LUT data), which are stored in the memory 440 in advance, and the derived K-parameter.

A data format of the K-parameter may not be limited to the above-described example. According to various embodiments, an average value of some slopes may be used upon deriving the K-parameter. For example, the K-parameter may have a data format of $\{\{k_{11}, (k_{12}+k_{13})/2\}, \{k_{21}, (k_{22}+k_{23})/2\}, \{k_{31}, (k_{32}+k_{33})/2\}, \{k_{41}, (k_{42}+k_{43})/2\}\}$.

Meanwhile, according to various example embodiments, as in operation 903 of FIG. 9, the image processor 450 of the electronic device 401 may exclude a pixel value, of which reliability is determined as being lower than a specified reference, from among pixel values included in the first image, the second image, and the third image before operation 1703.

Also, according to various example embodiments, as in operation 909 of FIG. 9, the image processor 450 of the electronic device 401 may perform white balancing by using WB correction data corresponding to the verified light source after operation 1705.

FIGS. 17 and 18 are above described under the condition that three photoelectric elements are included in each pixel (or unit image sensor). However, embodiments of the present disclosure may not be limited thereto. For example, referring to reference numeral 640 of FIG. 6, four photoelectric elements may be included in each pixel of an image sensor. Alternatively, five or more photoelectric elements may be included in each pixel of an image sensor. Even though four or more photoelectric elements are disposed in one pixel, various embodiments of the present disclosure may be implemented by one skilled in the art based on the description of FIGS. 17 and 18

According to various example embodiments of the present disclosure, it may be possible to verify a light source of light reflected by a subject or a light source of light produced from the subject more precisely by using a first image based on a first group of optical paths and a second image based on a second group of optical paths having a phase difference with the first group of optical paths. Accordingly, more appropriate white balancing may be performed based on the light source verified more precisely. Since an algorithm for verifying a light source is simple, a speed at which a light source is verified may be improved, a computing resource may decrease, and power consumed to verify a light source may decrease.

According to an example embodiment, an electronic device may include an image sensor including a pixel array, and an image processor electrically connected with the image sensor. The image processor may be configured to acquire a first image of a subject generated based on a first group of optical paths and a second image of the subject generated based on a second group of optical paths, the second group of optical paths having a phase difference with the first group of optical paths from the pixel array, to normalize pixel values included in the first image and pixel values included in the second image in units of a pixel, and to verify a light source of light reflected by the subject or a light source of light produced from the subject, based on a parameter associated with changes (e.g., development of changes, or tendency of changes) in the normalized pixel values.

In another example embodiment, the image processor may verify a type or a color temperature of a light source of light applied to the subject or the light source of the light produced from the subject, based on the parameter associated with a variation in the normalized pixel values.

In another example embodiment, the electronic device may further include a memory that stores data in which a type of a specified light source and a parameter associated with tendency of changes in pixel values in the specified light source correlate with each other. The image processor may verify a type of the light source of the light reflected by the subject or a type of the light source of the light produced from the subject, by comparing the parameter associated with tendency of changes in the normalized pixel values and data stored in the memory.

In another example embodiment, the electronic device may further include a memory that stores data in which a color temperature of a specified light source and a parameter associated with tendency of changes in pixel values in the specified light source correlate with each other. The image processor may verify a color temperature of the light source of the light reflected by the subject or a color temperature of the light source of the light produced from the subject, by comparing the parameter associated with tendency of changes in the normalized pixel values and data stored in the memory.

In another example embodiment, the pixel array may include a plurality of pixels, and each of the plurality of pixels may at least include a micro lens, a first photoelectric element, and a second photoelectric element. The image processor may acquire the first image by using the first photoelectric element included in each of the plurality of pixels and may acquire the second image by using the second photoelectric element included in each of the plurality of pixels.

In another example embodiment, the electronic device may further include a lens that allows the light reflected by the subject or the light produced from the subject to arrive at the pixel array, and a driver module that dynamically controls arrangement of the lens or the pixel array. The image processor may acquire the first image and the second image by adjusting the arrangement of the lens and the pixel array.

In another example embodiment, the electronic device may further include a lens that allows the light reflected by the subject or the light produced from the subject to arrive at the pixel array, and an aperture for adjusting the amount of light incident on the pixel array. The image processor may acquire the first image and the second image by adjusting the aperture.

In another example embodiment, the image processor may be configured to perform the normalization after excluding a pixel value, of which reliability is determined as being lower than a specified reference, from among the pixel values included in the first image and the pixel values included in the second image.

In another example embodiment, the image processor may determine a pixel value, which is saturated or is lower than a specified value, as a pixel value of which the reliability is low.

In another example embodiment, one of a plurality of predetermined colors may be allocated to each of pixels included in the pixel array. The image processor may acquire the first image and the second image for each of the plurality of predetermined colors, respectively.

In another example embodiment, the image processor may further acquire at least one third image of the subject generated based on at least one third group of optical paths having a phase difference with the first group of optical paths and the second group of optical paths from the pixel array. The image processor may normalize pixel values included in the first image, the second image, and the at least one third image in units of a pixel.

In another example embodiment, the electronic device may further include a memory configured to store white balance correction data corresponding to a light source. The image processor may acquire white balance correction data corresponding to the verified light source from the memory and may perform white balancing by using the acquired white balance correction data.

In another example embodiment, the white balance correction data stored in the memory may be optimized by an ISO value, a shutter speed value, or an aperture value of the electronic device.

According to an example embodiment, a method for verifying a light source of a captured image may include acquiring a first image of a subject generated based on a first group of optical paths and a second image of the subject generated based on a second group of optical paths having a phase difference with the first group of optical paths, normalizing pixel values included in the first image and pixel values included in the second image in units of a pixel, and verifying a light source of light reflected by the subject or a light source of light produced from the subject, based on a parameter associated with tendency of changes in the normalized pixel values.

In another example embodiment, the verifying of the light source may include verifying a type or a color temperature of a light source of light applied to the subject or the light source of the light produced from the subject.

In another example embodiment, the verifying of the light source may include verifying a type of the light source of the light reflected by the subject or a type of the light source of the light produced from the subject, by comparing the parameter associated with tendency of changes in the normalized pixel values and data stored in advance.

In another example embodiment, the verifying of the light source may include verifying a color temperature of the light source of the light reflected by the subject or a color temperature of the light source of the light produced from the subject, by comparing the parameter associated with tendency of changes in the normalized pixel values and data stored in advance.

In another example embodiment, the method may further include excluding a pixel value, of which reliability is determined as being lower than a specified reference, from among the pixel values included in the first image and the pixel values included in the second image, before performing the normalization.

In another example embodiment, a pixel value that is saturated or is lower than a specified value may be determined as a pixel value of which the reliability is low.

In another example embodiment, the acquiring of the first image and the second image may include acquiring the first image and the second image for each of a plurality of predetermined colors, respectively.

In another example embodiment, the method may further include performing white balancing by using white balance correction data corresponding to the verified light source.

The term "module" used herein may refer, for example, to a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various example embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various example embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various example embodiments of the present disclosure, it may be possible to verify a light source of light reflected by a subject or a light source of light produced from the subject more precisely by using a first image based on a first group of optical paths and a second image based on a second group of optical paths having a phase difference with the first group of optical paths. Accordingly, more appropriate white balancing may be performed based on the light source verified more precisely. Since an algorithm for the white balancing is simple, a speed at which a light source is verified may be improved, a computing resource may decrease, and power consumed to verify a light source may decrease.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an image sensor comprising a pixel array; and
an image processor electrically connected with the image sensor, wherein the image processor is configured to:
acquire a first image of a subject generated based on a first group of optical paths and acquire a second image of the subject generated based on a second group of optical paths, the second group of optical paths having a phase difference with the first group of optical paths from the pixel array,
normalize pixel values included in the first image and pixel values included in the second image in units of a pixel, and
verify a light source of light reflected by the subject and/or a light source of light produced from the subject, based on a parameter associated with changes in the normalized pixel values.

2. The electronic device of claim 1, wherein the image processor is configured to:
verify a type and/or a color temperature of a light source of light applied to the subject or the light source of the light produced from the subject, based on the parameter associated with a variation in the normalized pixel values.

3. The electronic device of claim 1, further comprising:
a memory configured to store data in which a type of a specified light source and a parameter associated with changes in pixel values in the specified light source are correlated with each other,
wherein the image processor is configured to verify a type of the light source of the light reflected by the subject and/or a type of the light source of the light produced from the subject, by comparing the parameter associated with changes in the normalized pixel values and data stored in the memory.

4. The electronic device of claim 1, further comprising:
a memory configured to store data in which a color temperature of a specified light source and a parameter associated with changes in pixel values in the specified light source are correlated with each other,
wherein the image processor is configured to verify a color temperature of the light source of the light reflected by the subject and/or a color temperature of the light source of the light produced from the subject, by comparing the parameter associated with changes in the normalized pixel values and data stored in the memory.

5. The electronic device of claim 1, wherein the pixel array includes a plurality of pixels,
wherein each of the plurality of pixels comprises:
a micro lens;
a first photodetector; and
a second photodetector,
wherein the image processor is configured to:
acquire the first image using the first photodetector included in each of the plurality of pixels, and
acquire the second image using the second photodetector included in each of the plurality of pixels.

6. The electronic device of claim 1, further comprising:
a lens configured to allow light reflected by the subject and/or the light produced from the subject to be directed to the pixel array; and
a driver module comprising driver circuitry configured to dynamically control arrangement of the lens or the pixel array,
wherein the image processor is configured to acquire the first image and the second image by adjusting the arrangement of the lens and the pixel array.

7. The electronic device of claim 1, further comprising:
a lens configured to allow light reflected by the subject and/or the light produced from the subject to be directed to the pixel array; and
an aperture configured to adjust the amount of light incident on the pixel array, wherein the image processor is configured to acquire the first image and the second image by adjusting the aperture.

8. The electronic device of claim 1, wherein the image processor is configured to perform normalization after excluding a specific pixel value from among the pixel values included in the first image and the pixel values included in the second image.

9. The electronic device of claim 8, wherein the specific pixel value comprises a pixel value that is saturated and/or a pixel value lower than a specified pixel value.

10. The electronic device of claim 1, wherein one of a plurality of predetermined colors is allocated to each of pixels included in the pixel array, and wherein the image processor is configured to acquire the first image and the second image for each of the plurality of predetermined colors, respectively.

11. The electronic device of claim 1, wherein the image processor is configured to:
   further acquire at least one third image of the subject generated based on at least one third group of optical paths having a phase difference with the first group of optical paths and the second group of optical paths from the pixel array, and
   normalize pixel values included in the first image, the second image, and the at least one third image in units of a pixel.

12. The electronic device of claim 1, further comprising:
   a memory configured to store white balance correction data corresponding to a light source,
   wherein the image processor is configured to:
   acquire white balance correction data corresponding to the verified light source from the memory, and
   perform white balancing using the acquired white balance correction data.

13. The electronic device of claim 12, wherein the white balance correction data stored in the memory is improved by using an ISO value, a shutter speed value, or an aperture value of the electronic device.

14. A method for verifying a light source of a captured image, the method comprising:
   acquiring a first image of a subject generated based on a first group of optical paths and acquiring a second image of the subject generated based on a second group of optical paths, the second group of optical paths having a phase difference with the first group of optical paths;
   normalizing pixel values included in the first image and pixel values included in the second image in units of a pixel; and
   verifying a light source of light reflected by the subject and/or a light source of light produced from the subject, based on a parameter associated with changes in the normalized pixel values.

15. The method of claim 14, wherein the verifying of the light source includes:
   verifying a type and/or a color temperature of a light source of light applied to the subject and/or the light source of the light produced from the subject.

16. The method of claim 14, wherein the verifying of the light source includes:
   verifying a type of the light source of the light reflected by the subject and/or a type of the light source of the light produced from the subject, by comparing the parameter associated with changes in the normalized pixel values and data stored in advance.

17. The method of claim 14, wherein the verifying of the light source includes:
   verifying a color temperature of the light source of the light reflected by the subject and/or a color temperature of the light source of the light produced from the subject, by comparing the parameter associated with changes in the normalized pixel values and data stored in advance.

18. The method of claim 14, further comprising:
   excluding a pixel value, having a reliability lower than a specified reference, from among the pixel values included in the first image and the pixel values included in the second image, before performing the normalizing.

19. The method of claim 14, wherein the acquiring of the first image and the second image includes:
   acquiring the first image and the second image for each of a plurality of predetermined colors, respectively.

20. The method of claim 14, further comprising:
   performing white balancing using white balance correction data corresponding to the verified light source.

* * * * *